US012770214B2

(12) United States Patent
Livesley et al.

(10) Patent No.: US 12,770,214 B2
(45) Date of Patent: *Oct. 20, 2026

(54) PROCESSOR HAVING FIRST AND SECOND PIPELINES AND BLOCKING CIRCUIT ENABLING SECOND PIPELINE TO PROCESS TASKS DURING DEALLOCATION OF MEMORY ALLOCATED TO FIRST PIPELINE

(71) Applicant: Imagination Technologies Limited, Kings Langley (GB)

(72) Inventors: Michael John Livesley, Hertfordshire (GB); Ian King, Hertfordshire (GB); Alistair Goudie, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 63 days.

This patent is subject to a terminal disclaimer.

(21) Appl. No.: 19/042,547

(22) Filed: Jan. 31, 2025

(65) Prior Publication Data

US 2025/0182235 A1 Jun. 5, 2025

Related U.S. Application Data

(63) Continuation of application No. 17/955,132, filed on Sep. 28, 2022, now Pat. No. 12,243,119.

(30) Foreign Application Priority Data

Sep. 30, 2021 (GB) ..................................... 2113990

(51) Int. Cl.
*G06T 1/20* (2006.01)
*G06T 1/60* (2006.01)

(52) U.S. Cl.
CPC .................. *G06T 1/20* (2013.01); *G06T 1/60* (2013.01); *G06T 2200/28* (2013.01)

(58) Field of Classification Search
CPC ......... G06T 1/20; G06T 1/60; G06T 2200/28; G06T 15/005
(Continued)

(56) References Cited

U.S. PATENT DOCUMENTS 5,630,149 A 5/1997 Bluhm
5,713,038 A 1/1998 Motomura
(Continued)

FOREIGN PATENT DOCUMENTS

CN 1719375 A 1/2006
CN 102436393 A 5/2012
(Continued)

OTHER PUBLICATIONS

Eisemann et al; "Fast Ray / Axis-Aligned Bounding Box Overlap Tests using Ray Slopes"; Jan. 8, 2008; Computer Graphics Lab; 21pages.

(Continued)

*Primary Examiner* — Prabodh M Dharia
(74) *Attorney, Agent, or Firm* — Potomac Law Group, PLLC; Vincent M DeLuca

(57) ABSTRACT

A processor includes a first processing pipeline, a second processing pipeline and a memory management that allocates memory regions from memory for the first processing pipeline to write the data of each of a first of a sequence of tasks, and deallocates each of the memory regions after the data therein has been processed by the second processing pipeline. A blocking circuit enables the second processing pipeline to start processing a second sequence of tasks while the memory management circuit is still deallocating some of the memory regions allocated to the data portions of the first of said sequence of tasks, the blocking circuit preventing identifiers of the data portions of the second task being passed to the memory management circuit until the memory
(Continued)

management circuit indicates that it has completed deallocating the memory regions allocated to all the data portions of the first task.

20 Claims, 10 Drawing Sheets

(58) Field of Classification Search
USPC .................................. 345/426, 522; 711/171
See application file for complete search history.

(56) References Cited

U.S. PATENT DOCUMENTS

| | | | |
|---|---|---|---|
| 5,742,822 | A | 4/1998 | Motomura |
| 6,532,017 | B1 | 3/2003 | Knittel et al. |
| 6,621,925 | B1 | 9/2003 | Ohmori et al. |
| 7,080,234 | B2 | 7/2006 | Saulsbury et al. |
| 7,602,395 | B1 | 10/2009 | Diard |
| 9,182,992 | B2 | 11/2015 | Guerrero |
| 9,286,069 | B2 | 3/2016 | Airaud et al. |
| 9,754,405 | B1 | 9/2017 | Young et al. |
| 10,445,295 | B1 | 10/2019 | Han et al. |
| 2002/0032849 | A1 | 3/2002 | Saulsbury et al. |
| 2006/0007234 | A1 | 1/2006 | Hutchins et al. |
| 2011/0148919 | A1 | 6/2011 | Heggelund et al. |
| 2012/0176386 | A1 | 7/2012 | Hutchins |
| 2013/0046951 | A1* | 2/2013 | Jones .................... G06F 12/023 711/171 |
| 2013/0076761 | A1 | 3/2013 | Ellis et al. |
| 2014/0118352 | A1* | 5/2014 | Hakura ..................... G06F 9/38 345/426 |
| 2014/0118380 | A1 | 5/2014 | Hakura et al. |
| 2015/0109314 | A1 | 4/2015 | Redshaw |
| 2015/0363970 | A1 | 12/2015 | Spinella-Mamo et al. |
| 2016/0217608 | A1 | 7/2016 | Howson |
| 2017/0256020 | A1 | 9/2017 | Sansottera et al. |
| 2017/0329632 | A1 | 11/2017 | Ma et al. |
| 2018/0197269 | A1 | 7/2018 | Broadhurst et al. |
| 2018/0197270 | A1 | 7/2018 | Howson et al. |
| 2018/0197271 | A1 | 7/2018 | Broadhurst et al. |
| 2018/0197323 | A1 | 7/2018 | Howson et al. |
| 2018/0286010 | A1 | 10/2018 | Koker et al. |
| 2018/0293183 | A1* | 10/2018 | Cooray ............... G06F 12/0802 |
| 2018/0357809 | A1 | 12/2018 | Lawless et al. |
| 2019/0042410 | A1* | 2/2019 | Gould ................... G06F 9/5016 |
| 2019/0205745 | A1 | 7/2019 | Sridharan et al. |
| 2019/0221024 | A1 | 7/2019 | Howson |
| 2019/0377503 | A1 | 12/2019 | Schluessler et al. |
| 2020/0004587 | A1 | 1/2020 | Griffin et al. |
| 2020/0104170 | A1 | 4/2020 | Else et al. |
| 2020/0151127 | A1 | 5/2020 | Amento et al. |
| 2020/0193685 | A1 | 6/2020 | Saleh et al. |
| 2020/0264970 | A1* | 8/2020 | Lee ....................... G06F 3/0631 |
| 2020/0380758 | A1 | 12/2020 | Novales et al. |
| 2021/0142438 | A1* | 5/2021 | Appu ........................ G06T 1/20 |
| 2021/0149679 | A1 | 5/2021 | Burns et al. |
| 2021/0224123 | A1 | 7/2021 | Iuliano et al. |
| 2021/0279837 | A1* | 9/2021 | Edwards ............... G06F 12/084 |

FOREIGN PATENT DOCUMENTS

| | | | |
|---|---|---|---|
| CN | 108305318 | A | 7/2018 |
| CN | 110659115 | A | 1/2020 |
| CN | 110998649 | A | 4/2020 |
| CN | 111353928 | A | 6/2020 |
| CN | 111527485 | A | 8/2020 |
| CN | 111796574 | A | 10/2020 |
| CN | 113342513 | A | 9/2021 |
| CN | 113377524 | A | 9/2021 |
| EP | 2648107 | A1 | 10/2013 |
| EP | 3185128 | A1 | 6/2017 |
| EP | 3385850 | A1 | 10/2018 |
| EP | 3751507 | A1 | 12/2020 |
| EP | 3796263 | A1 | 3/2021 |
| GB | 2555929 | A | 5/2018 |
| WO | 0195257 | A1 | 12/2001 |
| WO | 2007002592 | A2 | 1/2007 |

OTHER PUBLICATIONS

Kay et al; "Ray Tracing Complex Scenes"; ACM SIGGRAPH Computer Graphics; vol. 20; No. 4; 1986; pp. 269-278.
Mahovsky et al; Fast Ray-Axis Aligned Bounding Box Overlap Tests with Plucker Coordinates; Journal of Graphics Tool; vol. 9; No. 1; pp. 35-46 2004.
Majercik et al; "A Ray-Box Intersection Algorithm and Efficient Dynamic Voxel Rendering"; Journal of Computer Graphics Techniques; vol. 7; No. 3; 2018.
Patney et al., "Pike: A Framework for Authoring Programmable Graphics Pipelines," ACM Transactions on Graphics, vol. 34, No. 4; Article 147, Jul. 27, 2015, pp. 1-13.
Wald; "Realtime Ray Tracing and Interactive Global Illumination"; PHD Thesis; 308 pages.

* cited by examiner

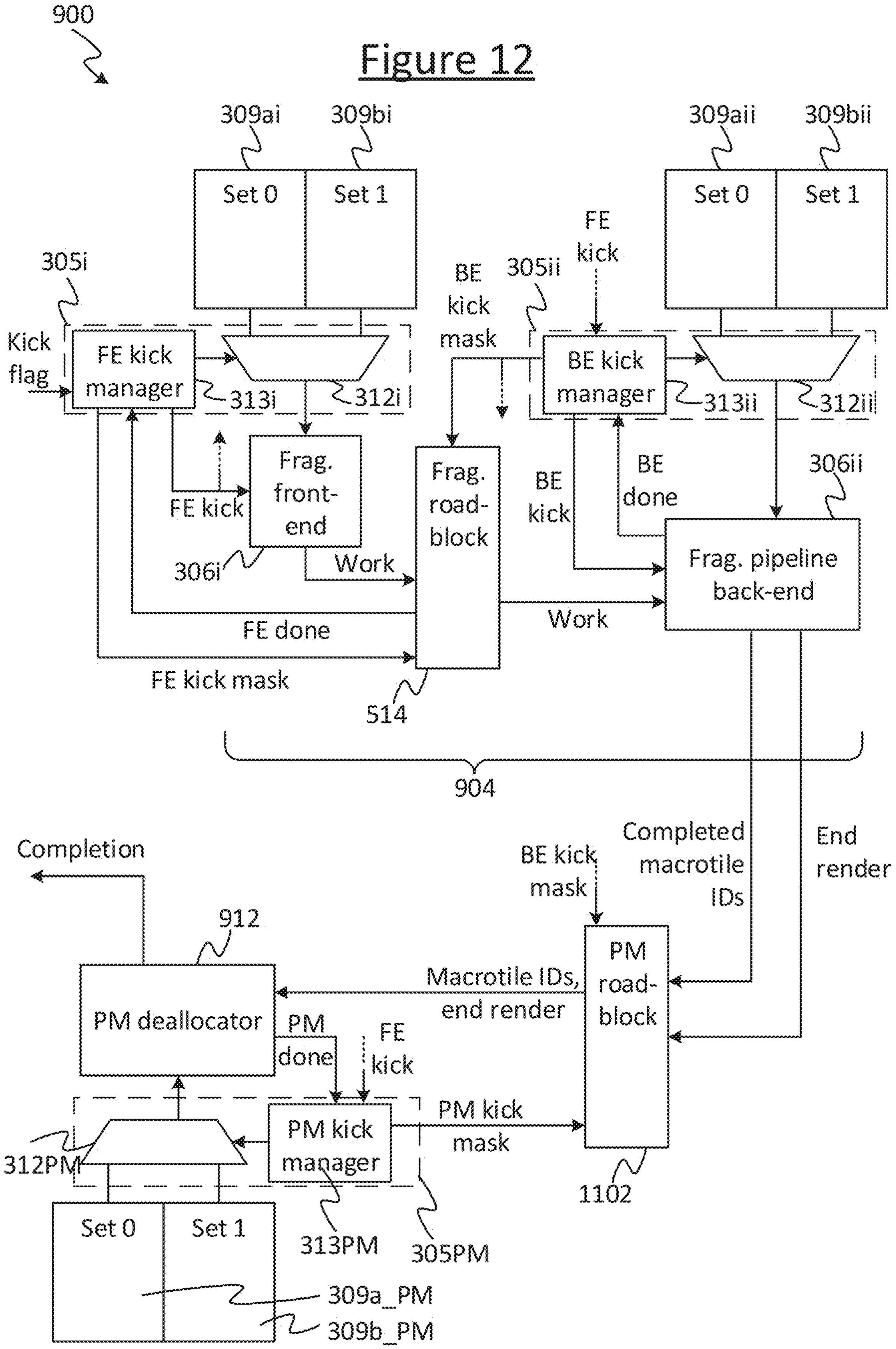
900
Figure 12
309ai
309bi
309aii
309bii
Set 0
Set 1
Set 0
Set 1
305i
Kick flag
FE kick manager
313i
312i
BE kick mask
305ii
FE kick
BE kick manager
313ii
312ii
Frag. front-end
FE kick
306i
Work
Frag. road-block
BE kick
BE done
306ii
Frag. pipeline back-end
FE done
Work
FE kick mask
514
904
Completion
BE kick mask
Completed macrotile IDs
End render
912
PM deallocator
Macrotile IDs, end render
PM road-block
PM done
FE kick
PM kick manager
PM kick mask
312PM
1102
Set 0
Set 1
313PM
305PM
309a_PM
309b_PM

PROCESSOR HAVING FIRST AND SECOND PIPELINES AND BLOCKING CIRCUIT ENABLING SECOND PIPELINE TO PROCESS TASKS DURING DEALLOCATION OF MEMORY ALLOCATED TO FIRST PIPELINE

CROSS-REFERENCE TO RELATED APPLICATIONS AND CLAIM OF PRIORITY

This application is a continuation under 35 U.S.C. 120 of copending application Ser. No. 17/955,132 filed Sep. 28, 2022, now U.S. Pat. No. 12,243,119, which claims foreign priority under 35 U.S.C. 119 from United Kingdom Application No. 2113990.2 filed Sep. 30, 2021, the contents of which are incorporated by reference herein in their entirety.

BACKGROUND

Some processors can be designed with application-specific hardware that performs certain dedicated operations in fixed-function circuitry. An example of such a processor is a GPU (graphics processing unit), which may comprise one or more dedicated graphics processing pipelines implemented in hardware (note that for the purpose of the present disclosure, the term "processing" does not necessarily imply processing in software).

For instance, a tile-based GPU may comprise a dedicated geometry processing pipeline, and/or a dedicated fragment processing pipeline. As will be familiar to a person skilled in the art, geometry processing transforms a 3D model from 3D world space to 2D screen space, which is divided into tiles in a tile-based system. The 3D model typically comprises primitives such as points, lines, or triangles. Geometry processing comprises applying a viewpoint transform, and may also comprise vertex shading, and/or culling and clipping the primitives. It may involve writing a data structure (the "control stream") for each tile, which describes a subset of the primitives from which the GPU can render the tile. Thus the geometry processing involves determining which primitives fall in which tile. The fragment processing, also called the rendering stage, takes the list of primitives falling within a tile, converts each primitive to fragments (precursors of pixels) in 2D screen space, determines what colour the fragments should be and how the fragments contribute to pixels (the elements to be lit up on screen) within the tile. This may involve applying fragment shading which performs texturing, lighting, and/or applying effects such as fog, etc. Textures may be applied to the fragments using perspective correct texture mapping.

The software running on the execution logic of an application-specific processor, such as a GPU, requires a mechanism to be able to delegate tasks to one of its dedicated hardware pipelines for processing. To enable this the processor comprises a register bank to which the software can write a descriptor of a task. The descriptor describes the task (i.e. workload) to be performed. To do this, the descriptor may comprise data to be operated on by the task, or more usually pointers to the data in memory. And/or, the descriptor may comprise one or more parameters of the task, or pointers to such parameters in memory. The descriptor may be constructed by the software according to an instruction from elsewhere, e.g. a driver running on a host CPU, and may require that data relating to the task is read from memory. Alternatively the descriptor may have been constructed by a hardware pipeline running a previous task (e.g. which is how a fragment pipeline may work, running on data structures previously written by a geometry pipeline).

Once the descriptor is written, the software asserts a ready flag, also sometimes called a "kick flag", which triggers the hardware pipeline to start processing the task based on the descriptor found in the register bank. The processing of a task by the hardware pipeline may also be referred to as a "kick". Once it has completed the task, the hardware pipeline writes a result of the processing to a structure in memory. For example in the geometry phase, the geometry pipeline may write an internal parameter format (control stream and primitive blocks), and in the fragment phase the fragment pipeline writes the frame buffer (pixel colour and alpha data) and depth buffer (pixel depth values). The pipeline may also write a result such as a final status of the task back to the register bank. Once the results are written, the pipeline then asserts another flag in an interrupt register. This causes the software to read the results from the memory and/or registers. The software can then write a descriptor of a new task to the register bank, and so forth.

A number of graphics processors take a "two-stage" approach to geometry and fragment processing. This means the geometry pipeline writes the results of its processing to memory in the form of an intermediate data structure (e.g. comprising the control streams and primitive blocks), and the fragment processing pipeline reads this data structure back from memory in order to perform the fragment processing based thereon. This contrasts with an "immediate rendering" approach used in other graphics processors, whereby results of the geometry processing are passed directly to the fragment processing pipeline rather than via memory.

In the two-stage approach, the geometry pipeline writes a piece of data (e.g. a control stream) to memory for each tile to be processed by the fragment stage. A memory management circuit (sometimes called the "parameter manager") is provided in order to allocate pages of memory to the geometry pipeline to use to write the tile data. The parameter manager also deallocate pages of memory again once no longer needed. For the purpose of managing the memory allocation and deallocation, the render area is divided into macrotiles, each subdivided into a plurality of tiles. The parameter manager (memory management circuit) keeps a list of which memory pages have been allocated for storing the tile data of which macrotiles. When the fragment pipeline has finished processing a given macrotile, it sends an ID of that macrotile back to the parameter manager. Once the parameter manager has received the ID or IDs of every macrotile to which a given page is allocated (there could be more than one macrotile per memory page), the parameter manager then deallocates the page in question so that it is freed for storing other data (whether that be tile data of another macrotile or data of some other function or application). Deallocating memory space is sometimes also called "recycling" of memory.

The coarse division of a render area into macrotiles gives a compromise in the way memory is deallocated. If the render area was not divided up at all for the purpose of memory management, and instead all the memory allocated to a whole render was only deallocated once the fragment pipeline had finished processing the entire render, then this would add latency because freeing memory takes time and all the deallocation would have to be done at the end of a kick. On the other hand, it would not be practical to allocated and deallocate memory on a tile-by-tile basis, as this would require very fine-grained control over which tile is allocated to which address range in memory, and the burden of tracking memory on this basis would itself cause latency. The use of macrotiles gives a good trade-off between these two extremes. E.g. a macrotile might be 4×4 tiles, and a tile might be 32×32 pixels in size.

However, there is still some latency due to the recycling of the memory of the last few macrotiles at the end of a fragment kick. In addition, there are typically certain "housekeeping" functions that need to be done at the end of the kick, such as invalidating and flushing caches, etc. It would be desirable to be able to overlap the deallocation of memory from one fragment kick with the fragment processing of the next fragment kick.

SUMMARY

According to one aspect disclosed herein, there is provided a graphics processor comprising: geometry processing logic arranged, for each of a sequence of tasks, to perform geometry processing and write a data structure resulting therefrom to a memory, the data structure for each task comprising respective tile data for each of a plurality of tiles of a render area; and fragment processing logic arranged to read the tile data of each of the tasks from the memory and perform fragment processing based thereon. The processor also comprises a memory management circuit arranged to allocate memory regions from the memory to be used by the geometry processing logic to write the tile data, and to deallocate each of the memory regions after the tile data therein has been processed by the fragment processing logic. For each task, the memory management circuit is configured to track which of the memory regions are allocated to hold the tile data of which of a plurality of spatial units into which the render area is divided, each spatial unit encompassing one or more tiles. For each respective one of the spatial units, the fragment processing logic is configured so as, once it has finished processing the tile data of the respective spatial unit, to send an identifier of the respective spatial unit to the memory management circuit. The memory management circuit is configured to deallocate each respective one of the memory regions once the memory management circuit has received the identifier of every spatial unit to which that region is allocated. The graphics processor further comprises a blocking circuit enabling the fragment processing logic to start processing the tile data of a second of said series of tasks while the memory management circuit is still deallocating some of the memory regions allocated to the spatial units of a first of said series of tasks. This is enabled by the blocking circuit being configured to prevent the identifiers of the spatial units of the second task being passed to the memory management circuit until the memory management circuit indicates that it has completed deallocating the memory regions allocated to all the spatial units in the first task.

The fragment processing is performed tile-by-tile, i.e. in the fragment phase the writing to and reading from the memory of the data structure is performed on a per-tile basis and each tile is processed individually. For the purpose of the allocation and de-allocation of memory, the render area is also divided into different spatial units. For example the spatial units may be macrotiles, each comprising a plurality of tiles. The memory regions may comprise pages of a virtual memory addressing scheme.

The memory management circuit should not be supplied with the IDs of units of the next task while it is still working on clearing memory of the current task, because the memory management circuit may need to be configured for a given task and the configuration may change from one task to the next. For example any of the following could change: the location of state buffers in memory from which the memory management circuit is accessing state the state information in such state buffers, the location of configuration registers the memory management circuit is using, the configuration information in such registers, and/or which stacks the memory management circuit is returning physical pages to. For instance when processing a kick the PM loads state buffers from memory which tell it where the free stacks are (to return physical pages) and the size of the data structures which were written in the geometry processing. This is then combined with the freed macrotile information from the fragment processing logic in order to perform freeing of pages. Such information may all change from one kick to the next.

The presently disclosed blocking circuit acts as a "roadblock" or "valve" that prevents the IDs of the spatial units (e.g. macrotiles) of the second (i.e. next) kick from being supplied to the memory management circuit for deallocation while the memory management circuit is still working on the first (current) kick, which could otherwise cause configuration issues from one task to the next. Thus the blocking circuit enables the fragment processing logic (e.g. pipeline) to begin processing the render of the second kick while the memory management circuit is still recycling the memory of the first kick.

Another potential issue in some applications is that constructing a task descriptor and writing to the register bank may take a non-negligible amount of time. There is therefore a period while the hardware pipeline is idle between tasks, waiting for the software to write the descriptor of the next task to the register bank before it can start processing the next task. It would be desirable to mitigate this effect.

Therefore in embodiments, the processor may comprise a geometry register bank to which software can write a first geometry task descriptor specifying the geometry processing of the first task, and a second geometry task descriptor specifying the geometry processing of the second task, the geometry processing logic being arranged to perform the geometry processing of the first and second tasks based on the first and second geometry task descriptors, respectively, from the geometry register bank. The geometry register bank may be operable to hold both the first and second geometry task descriptors at once, and the geometry processing logic may be configured to begin performing the geometry processing of the first task while the software is still writing the second geometry task descriptor to the geometry register bank.

Alternatively or additionally, the processor may comprise a fragment register bank to which software can write a first fragment task descriptor specifying the fragment processing of the first task, and a second fragment task descriptor specifying the fragment processing of the second task, the fragment processing logic being arranged to perform the fragment processing of the first and second tasks based on the first and second fragment task descriptors, respectively, from the fragment register bank. The fragment register bank may be operable to hold both the first and second fragment task descriptors at once, and the fragment processing logic may be configured to begin performing the fragment processing of the first task while the software is still writing the second fragment task descriptor to the fragment register bank.

This is possible because, unlike in conventional processors, the register bank is capable of holding two or more descriptors at once.

It also takes time for the software to respond when a task completes—e.g. due to the time taken servicing the interrupt, fetching interrupt handling code from memory, executing it, reading registers to obtain status information, etc. It may be desirable to mitigate this idle time that can exist after processing a task, as well as before.

Preferably therefore, in embodiments the geometry processing logic may be configured to begin performing the geometry processing of the second task while the software is post-processing a result of the geometry processing of the first task. And/or, the fragment processing logic may be configured to begin performing the fragment processing of the second task while the software is post-processing a result of the fragment processing of the first task.

In embodiments the geometry processing logic may take the form of a geometry pipeline. And/or, the fragment processing logic may take the form of a fragment pipeline.

A further issue that may be relevant in some applications is that the time for a pipeline to spin up and spin down may not be negligible. Spin-up refers to the period when a pipeline is still filling up at the start of a kick. Spin-down refers to the period when the pipeline is draining out at the end of a kick. During these periods the pipeline is not running at full efficiency. It would be desirable to be able to overlap the spin up of one kick with the spin down of another kick.

In embodiments therefore, the geometry pipeline may be arranged into an upstream geometry pipeline section arranged to perform an upstream phase of the geometry processing, a downstream geometry pipeline section arranged to perform a downstream phase of the geometry processing, and geometry pipeline blocking circuitry disposed between the upstream and downstream geometry pipeline sections. The geometry pipeline blocking circuitry may be arranged to enable the upstream geometry pipeline section to begin the upstream phase of the geometry processing of the second task while the downstream geometry pipeline section is still performing the downstream phase of the geometry processing of the first task. This is enabled by preventing intermediate results from the upstream phase of the geometry processing of the second task passing from the upstream geometry pipeline section to the downstream geometry pipeline section until the downstream geometry pipeline section has finished the downstream phase of the geometry processing of the first task.

Alternatively or additionally, the fragment pipeline may be arranged into an upstream fragment pipeline section arranged to perform an upstream phase of the fragment processing, a downstream fragment pipeline section arranged to perform a downstream phase of the fragment processing, and fragment pipeline blocking circuitry disposed between the upstream and downstream fragment pipeline sections. The fragment pipeline blocking circuitry may be arranged to enable the upstream fragment pipeline section to begin the upstream phase of the fragment processing of the second task while the downstream fragment pipeline section is still performing the downstream phase of the fragment processing of the first task. This is enabled by preventing intermediate results from the upstream phase of the fragment processing of the second task passing from the upstream fragment pipeline section to the downstream fragment pipeline section until the downstream fragment pipeline section has finished the downstream phase of the fragment processing of the first task.

The processor may be embodied in hardware on an integrated circuit. There may be provided a method of manufacturing, at an integrated circuit manufacturing system, a processor. There may be provided an integrated circuit definition dataset that, when processed in an integrated circuit manufacturing system, configures the system to manufacture a processor. There may be provided a non-transitory computer readable storage medium having stored thereon a computer readable description of a processor that, when processed in an integrated circuit manufacturing system, causes the integrated circuit manufacturing system to manufacture an integrated circuit embodying a processor.

There may be provided an integrated circuit manufacturing system comprising: a non-transitory computer readable storage medium having stored thereon a computer readable description of the processor; a layout processing system configured to process the computer readable description so as to generate a circuit layout description of an integrated circuit embodying the processor; and an integrated circuit generation system configured to manufacture the processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which:

FIG. 12 is a schematic block diagram showing an example implementation of a graphics processor including the modification of FIG. 11.

Figure 1:
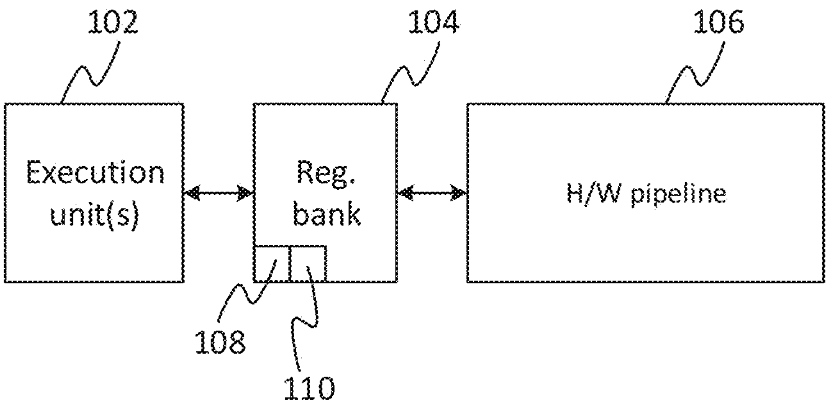
FIG. 1 is a schematic block diagram of a processor comprising a hardware pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

I. Overlapping Processing of One Task with Register Writes and/or Post-Processing of Another Task The following describes a scheme which may optionally be used with that of subsections II and/or III. However this is not essential and in other embodiments the scheme of subsection III may be used independently.

Conventionally, idle time is introduced into a processor such as a GPU when software running on execution logic of the processor is configuring the processor's hardware for a new workload, or post-processing an existing workload (such as by examining dependencies to determine what should be submitted next, for example).

The present disclosure provides for the addition of multiple buffered configuration registers, intelligently partitioned and managed by control circuitry (the "kick tracker") along with mux/demux circuitry, in order to allow the above-mentioned idle time to be reduced or even eradicated. The software (e.g. firmware) can set up and issue a kick on the hardware which will be held internally pending until it can be processed by the hardware. Completion of the workload may be immediately followed by the next pending workload, with the software able to post-process offline preserved state from the first workload while the hardware continues processing the next workload.

FIG. 1 illustrates a conventional application-specific processor such as a GPU. The processor comprises execution logic 102, a register bank 104 and a hardware pipeline 106. The execution logic 102 comprises one or more execution units for executing software in the form of machine code instructions stored on a memory of the processor (not shown). The software may be referred to as firmware. The execution logic 102 is operatively coupled to the register bank 104 in order to allow the software running on the execution logic 102 to write values to the register bank 104 and read values from the register bank 104. The hardware pipeline 106 is also operably coupled to the register bank 104, so as to be able to write values to the register bank 104 and read values from the register bank 104. The register bank 104 includes a "kick pulse" register 108 for holding a flag referred to as the "kick pulse", and an interrupt register 110 for holding an interrupt flag.

In a GPU, the hardware pipeline 106 may be a geometry processing pipeline or a fragment processing pipeline. Other examples found in GPUs include 2D processing pipelines, ray tracing, and compute pipelines. A GPU would typically have multiple such hardware pipelines, each with a respective register bank 104. For convenience FIG. 1 shows just one such pipeline 106 and its respective register bank 104.

By means of the register bank 104, the software running on the execution unit(s) 102 of the processor can issue a task (comprising a workload) to a hardware pipeline 106. This is done by the firmware writing a descriptor of the task to the register bank 104. The descriptor may comprise values pertaining to configuration of the hardware pipeline 106, and/or may provide addresses in external memory for the pipeline 106 to fetch the workload. E.g. in the case of a GPU, the values written to the register bank 104 may comprise things such as the screen resolution in pixels, what anti-aliasing factor is enabled, and what format to write the frame buffer output in, etc., as well as pointers to data to be processed.

In embodiments, a given task, as described by a given descriptor, may comprise the processing of a given render, or a given sub-render of a given render. Different tasks described by different descriptors may comprise the processing of different renders or performing different sub-renders of the same render. For example within a frame there may be many geometry kicks and many fragment kicks as the processing of a given frame may involve separate passes, or renders, that do things like generate depth data used in an additional kick or do render to texture which is then referenced in another kick. Any given render may process a render area that differs to the frame area. For example the render may only relate to a section of the frame, or may not even necessarily directly correspond to a section of the frame (e.g. it may relate to a small area to be used as a texture in another render pass, or a shadow map that may be much larger in area than the eventually output frame). A render may itself be composed of multiple sub-renders or passes. In embodiments there may be a one-to-one or many-to-one relationship between geometry kicks and fragment kicks, and a many-to-one relationship between fragment kicks and a frame. So for example ten geometry kicks may generate the data for one fragment kick, and that may be done twice for a frame. Or another example could be to run forty-five geometry kicks each with a single fragment kick after to form the frame.

Once the software has written a descriptor to the register bank 104, it then writes a "kick pulse" to the kick pulse register 108. This acts as a flag to the hardware pipeline 106 that the descriptor is ready to be serviced, and triggers the hardware pipeline 106 to start processing the workload defined by the descriptor. When thus "kicked", the pipeline 106 reads the descriptor from the register bank 104 and performs the task specified by the descriptor. The hardware pipeline reads the workload and processes it according to the configuration registers, and then indicates completion to the firmware via an interrupt, by writing an interrupt flag to the interrupt register 110.

One or more results of the processing may be written back to memory, or to the register bank 104, or a combination. An example of a result written back to the register bank would be a status of the task at the end of the processing. In the case where a result is written back to the register banks 104, the interrupt causes the software running on the execution logic 102 to read the result back from the registers 104. Examples of a status that may be written back to the register bank 104 include: whether or not the task was successful, or whether it was completed in full or was context switched in the middle of processing and so ended early. In the latter case, this is an asynchronous interface between software and hardware, and so when the software issues a context switch request (to do something else higher priority and so stop mid progress work), the hardware may or may not act on it depending on when it arrives (it could arrive after the hardware is already naturally completing the kick). This is one such status register, which tells the software whether the in-flight context switch request had an effect (which means the kick was not complete, and may need to be resumed later if this work is required). Other examples of status that may be written back to the register bank 104 include things like checksums which can be used to compare against a reference to determine if the processing was correct.

From a software perspective, the software might be receiving work from a number of queues, each of which is associated with a workload type, e.g. a queue for 3D geometry processing, one for fragment processing, one for 2D graphics operations, etc. The firmware monitors these queues for work, and when scheduling one on the GPU writes the configuration registers and issues the 'kick' on the hardware through a final register write which starts the GPU working on it.

The period when the software is writing a descriptor to the register bank 104 may be referred to as the setup. The period when the hardware pipeline 106 is processing the task specified by the descriptor, and writing its result(s) to memory and/or registers 104, may simply be referred to as the processing period, or the "kick". Post-processing refers to the period when the results are there to be read, and the software is acting to service the result of the task and read any hardware registers 104 required in doing so. These are shown illustrated on a timeline in FIG. 2, where the setup is labelled 202, the hardware processing is labelled 204 and the post-processing is labelled 206. Once the hardware pipeline 106 has finished writing the result(s) and the software has finished post-processing the result(s), the software can then start writing a descriptor of the next task to the register bank 104. It then issues a new kick pulse to the kick register 108, triggering the hardware pipeline 106 to begin processing the next task based on the new descriptor, and so forth.

An issue with the conventional approach is that it creates bubbles in the pipeline 106. During the set-up and post-processing phases, the pipeline 106 has nothing to do. I.e. at the beginning of a cycle it is idle while waiting for the firmware 102 to set up the next descriptor in the registers 104. Also, at the end of the cycle the hardware pipeline 106 may be idle again while waiting for the software 102 to read out and-post-process the results from the registers 104 (and then set up the next task). The software needs to wait for the hardware pipeline 106 to finish writing its results before the software can start setting up a new descriptor, because those registers are still in use by the hardware-they are connected to modules in the hardware pipeline which would produce volatile behaviour if the contents was modified in the middle of a kick. In principle if the registers to which descriptors are written are separate to those which take the results, the software could start setting up a new descriptor before or during post-processing 206. However, the software is working on a queue of work, and with only a single set of result registers, it is most efficient (e.g. in terms of memory access patterns) to deal with one element of the queue (the post-processing) before moving onto the next.

Figure 4:
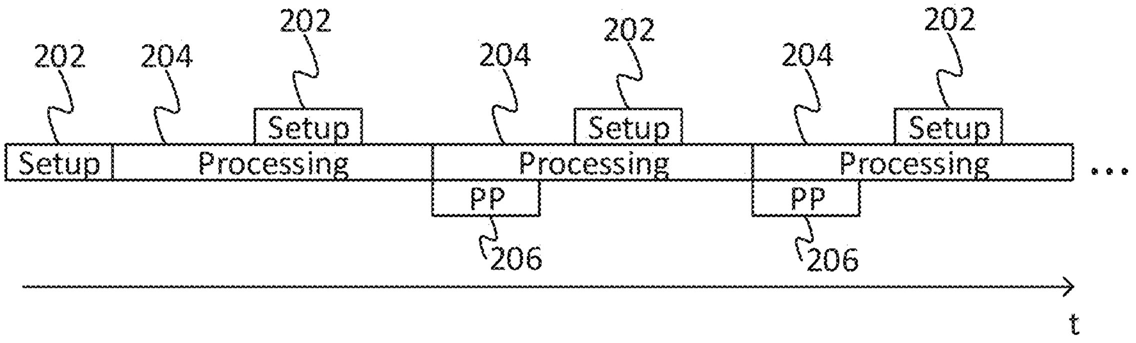
FIG. 4 is a timeline schematically illustrating the processing of a task by a hardware pipeline including overlapping of set-up and processing in accordance with embodiments disclosed herein.

It would be desirable to be able to temporally overlap the set-up of the next task with the processing of the current task. Preferably, it would also be desirable to be able to efficiently overlap the post-processing of the current task with the setup of the next task. An example of this aim is illustrated in FIG. 4.

Figure 3:
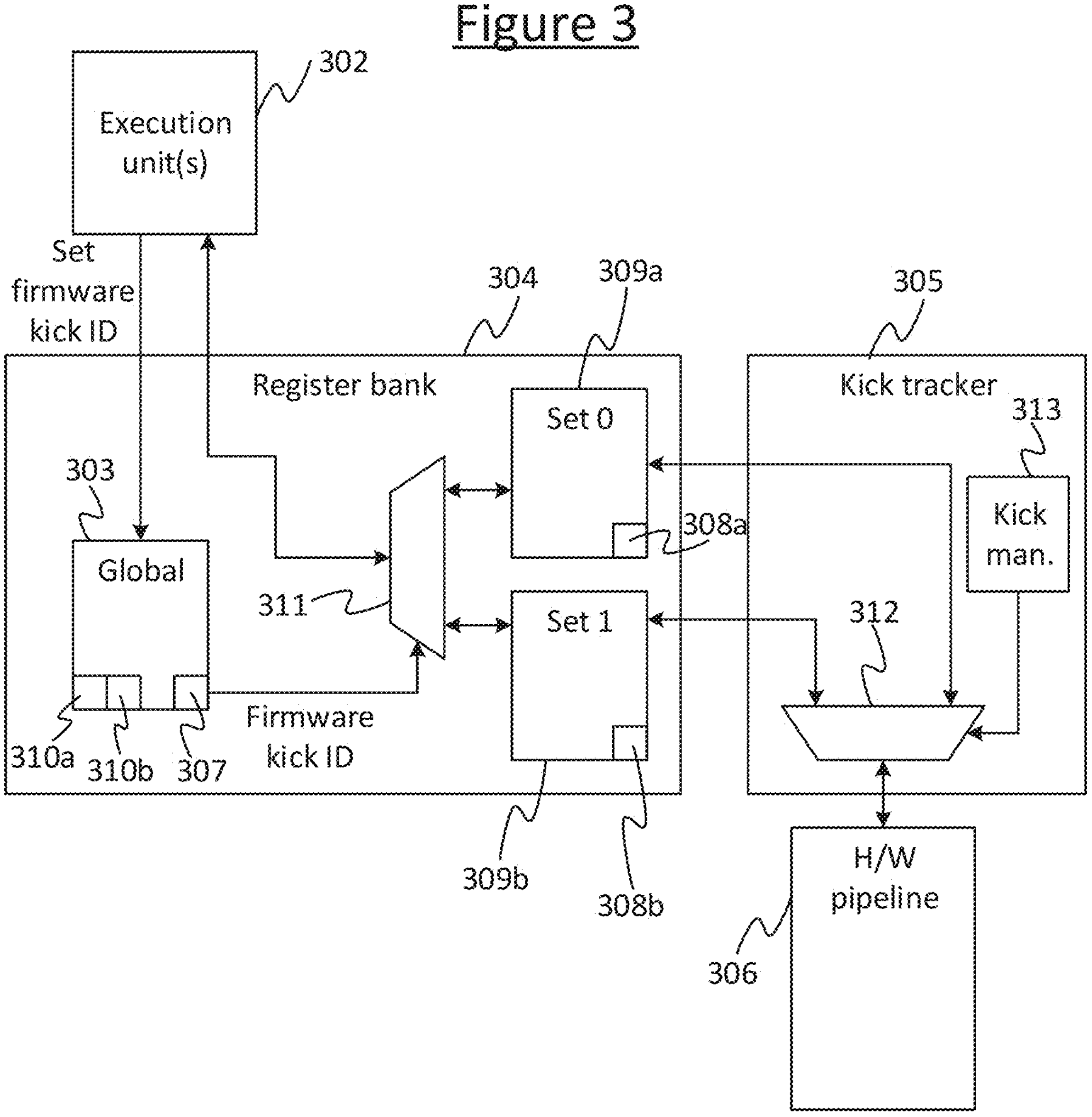
FIG. 3 is a schematic block diagram of a processor comprising control logic for controlling the processing of tasks by a hardware pipeline in accordance with embodiments disclosed herein.

Referring to FIG. 3, the presently disclosed processor enables this by having two sets of registers 309*a*, 309*b* in its register bank 304, each for setting-up a respective task.

The processor of FIG. 3 comprises execution logic 302, a register bank 304, a hardware pipeline 306, and control circuitry 305 which may be referred to herein as the "kick tracker". It will be appreciated that this is just a convenient label and any reference herein to the kick tracker could equally be replaced with the term "control circuitry".

The processor takes the form of an application-specific processor in that it has at least one hardware pipeline 306 for performing a certain type of processing, comprising special-purpose circuitry including at least some fixed-function hardware. This could consist purely of fixed-function hardware, or a mix of fixed-function hardware and programmable multi-function logic. The fixed function circuitry could still be configurable (such as to operate in different modes or with different parameters), but it is not programmable in the sense that it does not run sequences of instructions. Also, note that fixed-function or special-purpose does not necessarily mean the processor can only be used for the intended application, but rather that the hardware pipeline 306 comprises dedicated circuitry, configured to perform certain types of operation that are common in the intended application. For example the processor may take the form of a GPU and the hardware pipeline 306 may be a geometry pipeline, fragment pipeline, 2D processing pipeline, rendering pipeline or compute pipeline. The processor may in fact comprise multiple hardware pipelines of different types such as these. In this case the disclosed techniques may be applied independently to each hardware pipeline (a separate instance of the register bank 304 and kick tracker 305 being used for each), but for simplicity the following is described in relation to just one hardware pipeline 306. Note also that the applicability of the disclosed idea is not limited to a GPU. Other examples of processors which may include dedicated hardware pipelines include digital signal processors (DSPs), cryptoprocessors and AI accelerator processors.

The execution logic 302 comprises one or more execution units for executing software in the form of machine code instructions stored in a memory of the processor (not shown in FIG. 1). In certain implementations the software may be referred to as firmware in that it is low-level software for handling core functions of the application-specific processor, rather than user- or application-level software. However this is not essential and in general the software could be any kind of software.

The register bank 304 comprises a first register set 309*a* and a second register set 309*b*. The processor further comprises a first selector 311 associated with the register bank 304. The control circuitry (or "kick tracker") 305 comprises a management circuit (the "kick manager") 313 and a second selector 312. The kick tracker 313 is implemented in dedicated (fixed-function) hardware circuitry (as are the selectors 311, 312).

The execution logic 302 is operatively coupled to the register bank 304 via the first selector 311 in order to allow the software running on the execution logic 302 to write values to the register bank 304 and read values from the register bank 304. The hardware pipeline 306 is operably coupled to the register bank 304 via the second selector, so as to be able to write values to the register bank 304 and read values from the register bank 304. The first selector 311 is arranged to couple the execution logic 302 to either of the first register set 309*a* or the second register set 309*b* (but not both) at any one time. Thus the software running on the execution logic 302 can write to and read from either the first register set 309*a* or the second register set 309*b*, depending on which it is currently connected to. The second selector 312 is arranged to connect the hardware pipeline 306 to either the first register set 309*a* or the second register set 309*b* (but not both) at any one time. Thus the hardware pipeline 306 can read from and write back to either the first register set 309*a* or the second register set 309*b*, depending on which it is currently connected to. Each of the first and second selectors 311, 312 may also be described as a multiplexer-demultiplexer; in that the first selector 311 demultiplexes in the direction from execution logic 302 to register sets 309*a*, 309*b* and multiplexes in the direction from register sets 309*a*, 309*b* to execution logic 302; and the second selector 312 multiplexes in the direction from register sets 309*a*, 309*b* to hardware pipeline 306 and demultiplexes in the direction from hardware pipeline 306 to register sets 309*a*, 309*b*.

The software running on the execution logic 302 can thus write a descriptor of a task to either the first or second registers sets 309*a*, 309*b* at any one time; and the hardware pipeline 306 can read a descriptor of a task from either the first or second register set 309*a*, 309*b* at any one time. Similarly, in embodiments, the hardware pipeline 306 can write a result of a task back to either the first or second register set 309*a*, 309*b* at any one time; and the software can read a result of a task from either the first or second register set 309*a*, 309*b* at any one time. Alternatively or additionally, the hardware pipeline 306 may write some or all of its result(s) to a shared memory (not shown), from where the software may read back these result(s).

In embodiments the first and second tasks may comprise processing of different renders, or performing different sub-renders of the same render.

By controlling the second selector 312 to connect the hardware pipeline 306 to a different one of the first and second register sets 309*a*, 309*b* than the execution logic 302 is currently connected to via the first selector, the kick manager (i.e. management circuitry) 313 can thus control the hardware pipeline 306 to begin processing a current one of said tasks based on the descriptor in a current one of the first and second register sets 309*a*, 309*b* while the software is writing the descriptor of a next one of said tasks to the other of said first and second register sets 309*b*, 309*a*. Thus the set-up phase 202 of the next cycle can be overlapped partially or wholly with the processing stage 204 of the current cycle, as shown in FIG. 4.

Optionally, the post-processing 206 of the current cycle can also be overlapped with the processing stage 204 of the next cycle, as also shown in FIG. 4. However, this overlapping is not essential, for example if the post-processing is relatively brief compared to set-up.

An example implementation is as follows.

Each of the first and second register sets 309*a*, 309*b* includes its own respective ready register 308*a*, 308*b* for holding a respective ready flag. Each of these is somewhat akin to the kick pulse register 108 described in relation to FIG. 1, but with a separate instance for each the first and second register sets 308*a*, 308*b*. Also, when the software asserts the ready flag, this does not necessarily immediately issue a kick to the hardware pipeline 306. Instead this is arbitrated by the kick tracker 305, as will be discussed in more detail shortly. The ready registers 308*a*, 308*b* may each be referred to as a respective kick register of the respective register set 309*a*, 309*b*; and each ready flag may be described as a respective kick flag. However, again it will be appreciated that these is just convenient labels and could equally be replaced anywhere herein with the “ready” terminology.

In some embodiments there may also be a set of global registers 303 common to both tasks. Global registers are used for quantities that do not vary from kick to kick or frame to frame (in the case of a GPU), e.g. the power/clock gating setup of the pipeline 306, or whether parts of the pipeline 306 are powered down or up, or what parts of the pipeline 306 are statically configured to work together or not. Another example would be resets, etc.

The register bank 304 also comprises a kick ID register 307, and two completion registers 310*a*, 310*b* corresponding to the two individual register sets 309*a*, 309*b* respectively. Apart from these fields the register space of the bank 304 looks exactly the same to the software as it would in the prior system (so minimal modification to the software is needed).

The kick ID in the kick ID register 307 is writeable by the software, and controls the first selector 311 to connect either the first set of registers 309*a* or second set 309*b* to the execution logic 302. Thus the software can control which register set 309*a*, 309*b* it is currently connected to. Whichever one is currently connected, that is the register set to which the software can currently set-up a task by writing a task descriptor to that set. Once it has written a full task descriptor to a given one of the register sets 309*a*, 309*b*, the software then asserts the respective kick flag in the respective kick register 308*a* or 308*b*. Depending on implementation, the software may assert the kick flag by writing directly to the respective kick flag register 308*a/b*, or by sending a signal to the kick tracker 305 which causes the kick manager 313 to assert the kick flag. In other implementations a write to a kick register 308*a/b* may assert a kick flag that is maintained in other hardware, e.g. as a state change or in an internal register of the kick tracker 305.

As well as this, the system now comprises the kick tracker circuit 305 on the hardware side, which comprises another selector 312 which can connect a selected one of the two sets of registers 309*a*, 309*b* to the pipeline 306. The kick manager 313 of the kick tracker module 305 monitors the two kick registers 308*a*, 308*b* to determine when their respective kick flags are asserted, indicating that their respective sets of registers 309*a*, 309*b* are ready for processing, and controls the multiplexer 312 to select which one to connect to the pipeline 306 at any given time in order to keep the pipeline busy. In other words, the kick manager 313 accepts the kick inputs from kick registers 308*a*, 309*b* of the register bank 304, and keeps track of the order in which the software issued kicks to be processed. It marks them as pending until they are submitted for processing on the hardware, when they are marked active. The kick manager 313 is in control of the hardware kick selection (muxing registers 309*a*, 309*b* to HW) and also has a kick output which is connected to the hardware pipeline 306 which issues the actual kick pulse when it is determined to process it within the hardware 306.

The kick flag acts as a "kick" to the kick tracker 305 in the hardware, saying this kick is pending, and the hardware maintains it in a register saying it's pending, at least until such a time as the kick starts (goes active). In embodiments the kick flag is de-asserted as soon as the kick starts (i.e. the start of the hardware processing period 204).

Alternatively however it could instead be de-asserted later, either during the kick or at the end of the kick (i.e. hardware processing period 204), as long as it is done before the software needs to set up a new task descriptor in the same set of registers 309*a* or 309*b*. Depending on implementation, the kick flag may be de-asserted automatically by the kick manager 313 or hardware pipeline 106, or by the software. Also, in embodiments, the software may have the option de-assert the flag early in order to cancel a task before it starts, or to cancel the task by writing to another register.

The hardware pipeline 306 may write one or more results of the processing of the task to a memory (not shown in FIG. 3 but e.g. see FIG. 5), or the respective register set 309 or 309*b*, or a combination of memory and the registers.

When the hardware pipeline 306 has finished processing a current task based on the descriptor from the register set 309*a* or 309*b* to which it is currently connected, the hardware pipeline 306 will assert the respective completion flag 310*a* or 310*b*. This signals to the software that it can now start reading the result(s) of the respective task (which may be from memory, or the respective register set 309 or 309*b*, or a combination of memory and the registers).

The completion flag may be de-asserted by the software, at the earliest once it has begun the respective post processing 206. It could be de-asserted later, such as once the software has completed the respective post-processing phase 206, as long as it is de-asserted before the hardware pipeline 106 starts the processing 204 of the next task from the same set of registers 209*a* or 309*b*.

In embodiments the completion registers 310*a*, 310*b* may each be an interrupt register, in which case each completion flag is a respective interrupt flag which raises an interrupt when asserted. An 'interrupt' is a signal which when set causes the firmware to stop doing what it is currently doing and read a status register to determine what interrupted it and why, and then service that. However, the use of interrupts is not essential and in alternative implementations the software may simply observe the completion flags and decide for itself when to service the results of the corresponding tasks.

The kick manager 313 is also arranged to monitor the completion flags 310*a*, 310*b* (either directly or via another signal giving the same information). It will select to connect the hardware pipeline 306 to the next register set, and issue a kick pulse, once both: a) the completion flag of the current task is asserted, and b) the kick flag of the next task is asserted. The kick pulse then triggers the hardware pipeline 306 to service the task descriptor in the next register set, to which it is now connected.

At least at times, the register set 309*a* or 309*b* connected to the execution logic 302 for set-up can be different than the set connected to the pipeline 306 for processing. This allows the software run on the execution logic 302 to be setting up a new task in the second set of registers 309*b* while the hardware pipeline 306 is still processing the task from the first set of registers 309*a*. In embodiments, the software also finishes the cycle by reading out the result(s) of the first task from the first set of registers 309*a* while the pipeline 306 gets on with processing the data now set up in the second set 309*b*. This can repeat in an alternating cycle, switching the roles mutatis mutandis between the first and second register sets 309*a*, 309*b*. I.e. after each cycle, what was the next register set (and task therein) now becomes the new current one, and what was the current register set (and task) now becomes the new next.

The software 302 keeps track of the next firmware kick ID to process (i.e. the order of kicks submitted to hardware, e.g. so if it has multiple completion interrupts for the same workload it knows which to service first). In response to the completion flags in the interrupt registers 310*a*, 310*b*, the software reads back the results of the respective tasks. Apart from this the register bank 304 looks exactly the same as the bank 104 in the conventional system of FIG. 1.

In contrast to that conventional system, the flag in the kick pulse register 308 no longer directly triggers the pipeline 306 to process a task. Instead, it acts as a signal from the software to the kick tracker 305 that the data in the respective set of registers 309 is ready for processing, and it is the kick tracker 305 that selects the exact time to trigger the pipeline 306 once the data is ready to be processed.

Figure 7:
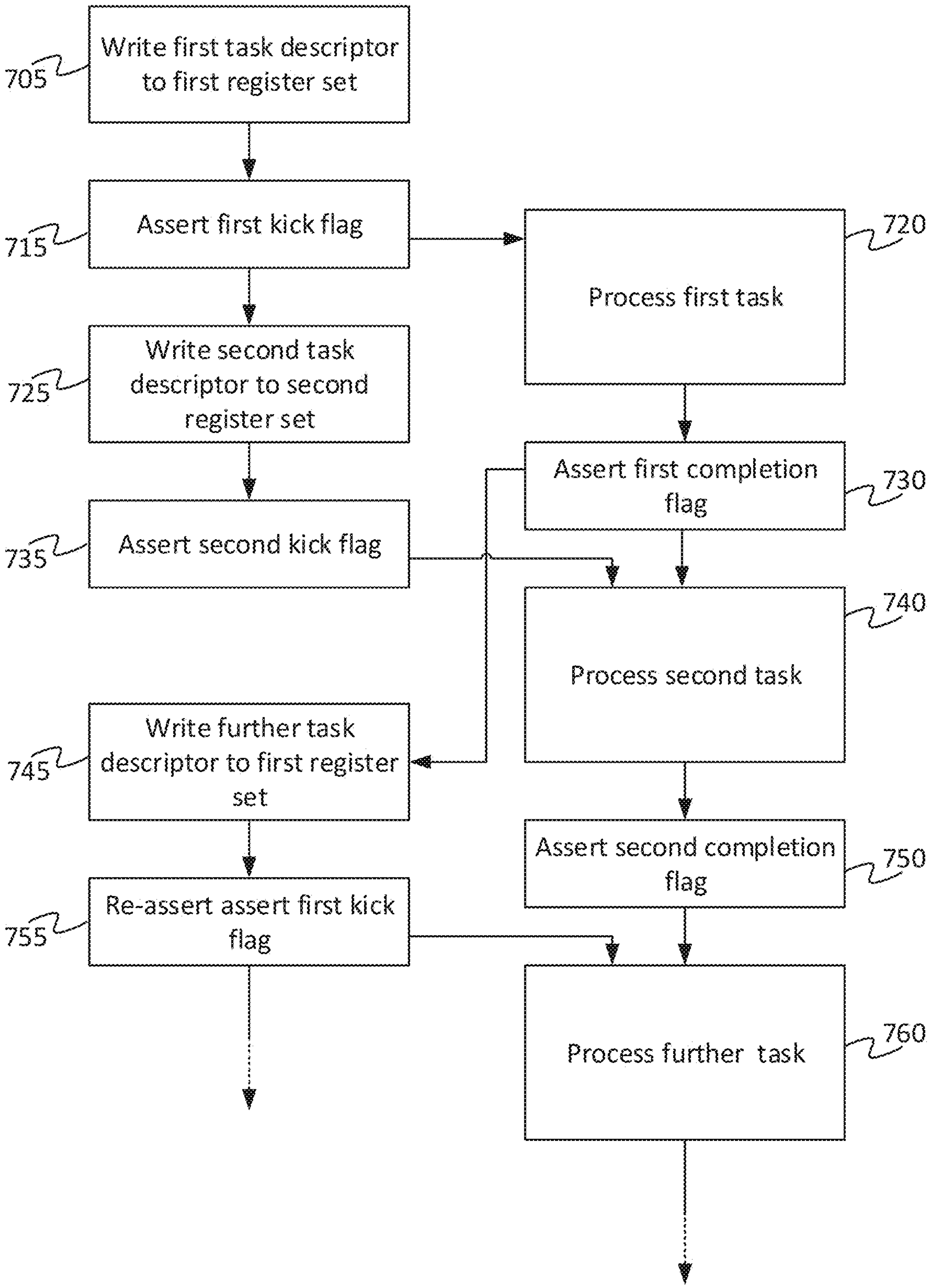
FIG. 7 is a flow chart of a method of controlling the processing of tasks by a hardware pipeline in accordance with embodiments disclosed herein.

FIG. 7 is a flow chart illustrating a method in accordance with embodiments disclosed herein. Steps in the left-hand column are performed by the software running on the execution logic 302, and steps in the right-hand column are performed by the hardware pipeline 306.

At step 705, the software selects to connect itself to the first register set 309*a* by writing the ID (e.g. 0) of the first register set 309*a* to the kick ID register 307. This controls the first selector 311 to connect the execution logic 302 to the first set of registers 309*a*. The software then writes a first task descriptor to the first register set 309*a*. Following this at step 715, the software asserts the first kick flag in the first kick register 308*a*. The kick manager 313 detects this, and in response (although perhaps not immediately, if the hardware pipeline 306 is processing a previous kick, as discussed further below with respect to steps 750, 755 and 760) controls the second selector 312 to connect the hardware pipeline 306 to the first register set 309*a*, and issues a kick pulse to the hardware pipeline 306. This causes, at step 720, the hardware pipeline 306 to start processing the first task as defined by the descriptor found in the first register set 309*a*. The kick manager 313 or hardware pipeline 306 may automatically de-assert the first kick flag once the processing of the first task has begun.

At step 725, while the hardware pipeline 306 is still processing the first task, the software selects to connect itself to the second register set 309*b* by writing the ID (e.g. 1) of the second register set 309*b* to the kick ID register 307. This controls the first selector 311 to connect the execution logic 302 to the second set of registers 309*b*. The software then writes a second task descriptor to the second register set 309*b*. This may be done partially or wholly while the hardware pipeline 306 is still processing the first task. Then at step 735, the software asserts the second kick flag in the second kick register 308*b*.

At step 730, the hardware pipeline 306 completes the processing of the first task, and signals this by asserting the first completion flag in the first completion flag register 310*a*. Note that step 730 may occur after step 735.

The kick manager 313 detects the assertion of the first completion flag, as well as the assertion of the second kick flag by the software. In response, on condition of both, the kick manager 313 controls the second selector 312 to connect the hardware pipeline 306 to the second register set 309*b*, and issues another a kick pulse to the hardware pipeline 306. This causes, at step 740, the hardware pipeline 306 to start processing the second task as defined by the descriptor found in the second register set 309*b*. The kick manager 313 or hardware pipeline 306 may automatically de-assert the second kick flag once the processing of the second task has begun.

The assertion of the first completion flag also signals to the software that it can start reading the result(s) of the first task (after which it may proceed to step 745 to write a new descriptor, as discussed shortly), and perform any post-processing required. In embodiments, the software may read and/or post-process some or all of the result(s) of the first task after the hardware pipeline 306 has started processing the second task. The software may de-assert the first completion flag once it has begun the post-processing of the result(s) of the first task.

At step 745, while the hardware pipeline 306 is still processing the second task, the software selects to connect itself back to the first register set 309*a* by writing the ID (e.g. 0) of the first register set 309*a* to the kick ID register 307. This controls the first selector 311 to connect the execution logic 302 back to the first set of registers 309*a*. The software then writes a further task descriptor to the first register set 309*a*. This may be done partially or wholly while the hardware pipeline 306 is still processing the second task. Then at step 755, the software re-asserts the first kick flag in the first kick register 308*b*.

At step 750, the hardware pipeline 306 completes the processing of the second task, and signals this by asserting the second completion flag in the second completion flag register 310*b*. Note that step 750 may occur after step 755. The kick manager 313 detects the assertion of the second completion flag, as well as the assertion of the first kick flag by the software. In response, on condition of both, the kick manager 313 controls the second selector 312 to connect the hardware pipeline 306 back to the first register set 309*a*, and issues another a kick pulse to the hardware pipeline 306. This causes, at step 760, the hardware pipeline 306 to start processing the further task as defined by the new descriptor now found in the first register set 309*a*. The kick manager 313 or hardware pipeline 306 may automatically de-assert the first kick flag again once the processing of the further task has begun.

The assertion of the second completion flag also signals to the software that it can start reading the result(s) of the second task, and perform any post-processing on the result (s) of the second task. In embodiments, the software may read and/or post-process some or all of the result(s) of the second task after the hardware pipeline 306 has started processing the further task. The software may de-assert the second completion flag once it has begun the post-processing of the result(s) of the second task.

The method may continue in this manner over a plurality of cycles, alternating between the hardware 306 processing the task specified in the first register set 309*a* in one cycle while the software is writing the next descriptor to the second register set 309*b*, and then in the next cycle the hardware 306 processing the task specified in the second register set 309*b* while the software is writing the next descriptor to the first register set 308*a*. In each cycle, optionally, the software may also read the result of the task processed in the previous cycle while the hardware 306 is processing the current cycle's task.

Although in the above embodiments the register bank 304 comprises only a pair or register sets 309*a*, 309*b* and the method alternates between them, this is not limiting. In other variants the register bank 304 may comprise more than two (e.g. three or four) register sets 309, each for holding a respective descriptor. In this case the first selector 311 is arranged to connect the execution logic 302 to any selected one of the multiple register sets 309, and the second selector 312 is arranged to connect the hardware pipeline 306 to any selected one of the multiple register sets 309. This enables the software to set-up more than two task descriptors while the hardware pipeline 106 is performing its processing. The software may cycle through the multiple register sets, writing a respective task descriptor to each, and the kick manager 313 may also cycle through the registers, servicing the descriptors therein out of phase with the writing of the descriptors to those registers by the software.

In such embodiments, each of the multiple register sets may have its own respective kick flag register 308. A respective completion register 310 may also be associated with each set. I.e. the completion registers can be provided as N flags (e.g. N bits), where N is the number of register sets (e.g. two in FIGS. 3, 309*a* & 309*b*). So enough bits are provided to allow a bit to be set for each register set associated with the kick tracker. The kick manager 313 may keep track of the kick flags asserted by the software and services them in order. The software may keep track of which register ID is next to write to and sets the kick ID register 307 accordingly. The software may keep track of the order in which the completion flags are raised and perform the post-processing of the respective tasks' results in that order.

In the case of more than two register sets 309, the writing and processing do not necessarily have to be done in an alternating sequence, whereby the software writes just one next task descriptor per cycle while the pipeline 306 processes the current task (though that is certainly one possibility). In other embodiments, the software could for example write multiple descriptors during the first kick being processed by the pipeline 306. Alternatively or additionally, the hardware may complete a kick in respect of multiple register sets before the software (e.g. firmware) can process any of the associated interrupts.

II. Overlapping Spin-Up/Down of One Task with Processing of Another Task

The following describes a scheme which may optionally be used with that of subsections I and/or III. However this is not essential and in other embodiments the scheme of subsection III may be used independently.

The pipeline of a processor such as a GPU is inefficient when spinning up or spinning down, when the whole pipeline is not loaded with work. These factors may also reduce the performance efficiency of the GPU, which is exacerbated as performance of the GPU is scaled up (e.g. by providing extra work capacity by providing multiple copies of the relevant GPU modules, which can run in parallel) as these times do not change.

Partitioning the pipeline into two or more sections, such as a "front end" and a "back end", and providing blocking circuitry between sections to stall new work from the next kick at a suitable partitioning point, allows spin up of a new kick to begin while an existing kick is spinning down, making the pipeline more efficient in its processing. The blocking circuit between a given pair of sections may be referred to herein as a "roadblock" or roadblock circuit. The partitioning point or "balance point", at which the roadblock is placed into the pipeline to divide between adjacent sections, is a design choice which may be chosen to avoid resource management related dependency complexities whilst still hiding latency and improving performance.

In embodiments individual kick trackers are provided to mux/demux and manage kicks within each section of the pipeline.

Figure 2:
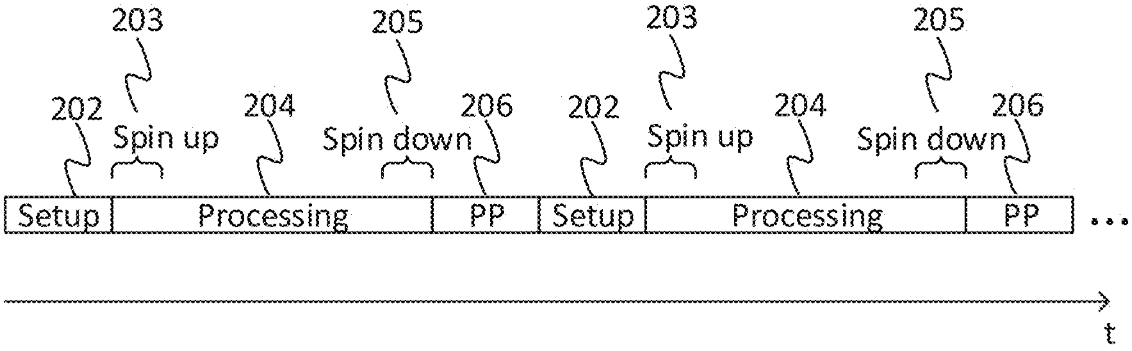
FIG. 2 is a timeline schematically illustrating the processing of a series of tasks by a hardware pipeline.

An example of the issue of pipeline spin-up and spin-down is illustrated in FIG. 2. As discussed previously, a conventional processor experiences idle time during the set-up and processing phases 202, 206 when the software is writing a task descriptor or post processing results, respectively. The design of FIG. 3 can be used to address this by enabling the set-up of the next task to be overlapped (in time) with the processing of the current task, and the post-processing of the current task to be overlapped in time with the setup of the next task. However, with the techniques of FIG. 3 alone, the pipeline will still not be running 100% efficiently during the processing phases 204 as there may be times when modules or stages within the pipeline are empty or idle. That is, whilst the next task may be readied whilst the current task is being processed, it may still not be started until the current task has completed spin down, and then the next task will itself still need to spin up. "Spin up" refers to the period 203 where the pipeline is still being filled with data, and "spin down" refers to the period 205 where the pipeline is being drained of data. I.e. in the spin-up period 203 the front stages of the pipeline are starting to process data but, but the first piece of data to be input has not yet reached the core of the pipeline (e.g. the shader clusters at the heart of the GPU). And in the spin-down period, the last stages of the pipeline are still processing data, but the last piece of data to be input has already passed the first stage of the pipeline.

For example the different tasks may comprise the processing of different renders in a GPU, or performing different sub-renders of a given render.

Figure 4A:
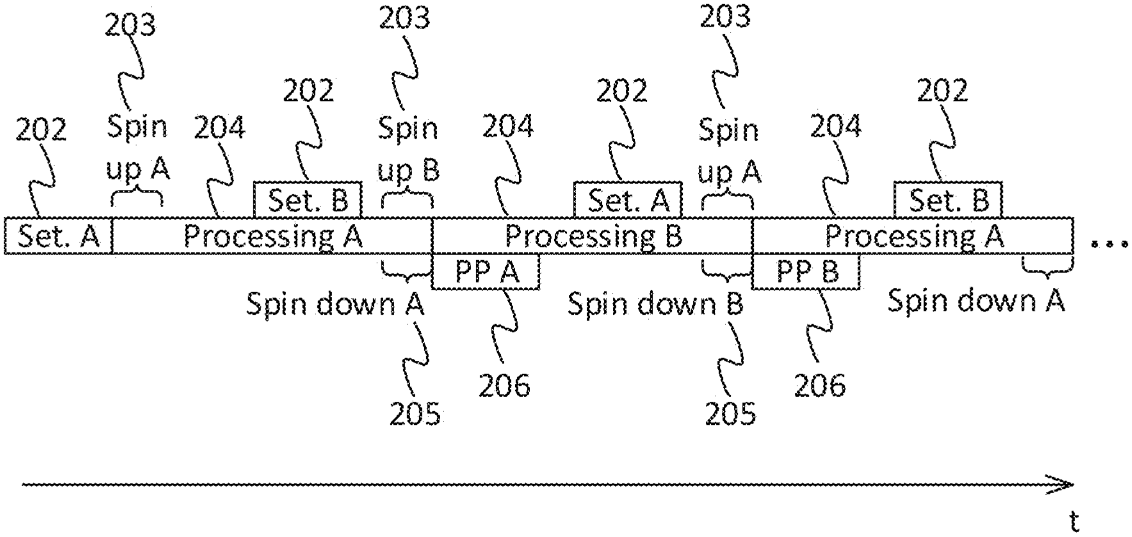
FIG. 4*a* is a timeline further illustrating, schematically, the overlapping of the spin up or down period of one task with the processing of another.

It would be desirable to overlap the spin up of one task with the spin down of the next task. By way of illustration, FIG. 4*a* shows a version of FIG. 4 whereby as well as overlapping the processing (kick) 204 of one task with the setup 202 of the next task and the post-processing 206 of the previous task, the spin up 203 of the next task is also overlapped with the spin down 205 of the current task. In this way, overlapping spin up and spin down aims to bring the efficiency of the pipeline much closer to 100% when moving from kick to kick.

However, one can't always simply start pushing the next task into the pipeline immediately after the first task, as soon as the first task starts spinning down, because there may be dependencies or configuration issues. For example, if one kick is running at a 1080p resolution and the next is running at 4*k* resolution, these require vastly different setup of various modules at various stages in the pipeline. These setups are generally performed in configuration registers, which may need to be reconfigured from one task to the next (e.g. between different frames or different renders or passes over the same frame). In that case conventionally, the next task cannot be inserted into the pipeline until the immediately preceding task has completely drained out, thus resulting in idle time in some of the stages in the pipeline. However, it is recognized herein that this idle time may be mitigated by placing a partition at a point in the pipeline dividing it into discrete sections which can take distinct configurations (each section potentially comprising multiple pipeline stages).

In terms of dependencies, sometimes one task will be updating a buffer with data such as depth data, and the next task may be working on doing processing which reads that depth data from memory. However, up to a point in the pipeline, initial fetches from memory of control stream and other related information to start spinning up and building work of the next task could still be done. Therefore as recognized herein, a partition may be placed at the point in the pipeline where the work of the next task starts being dependent on the buffer data being completed from the preceding task, so that the rest of the next task will not proceed until the previous task is done. Thus at least some degree of overlap can be achieved.

Figure 8:
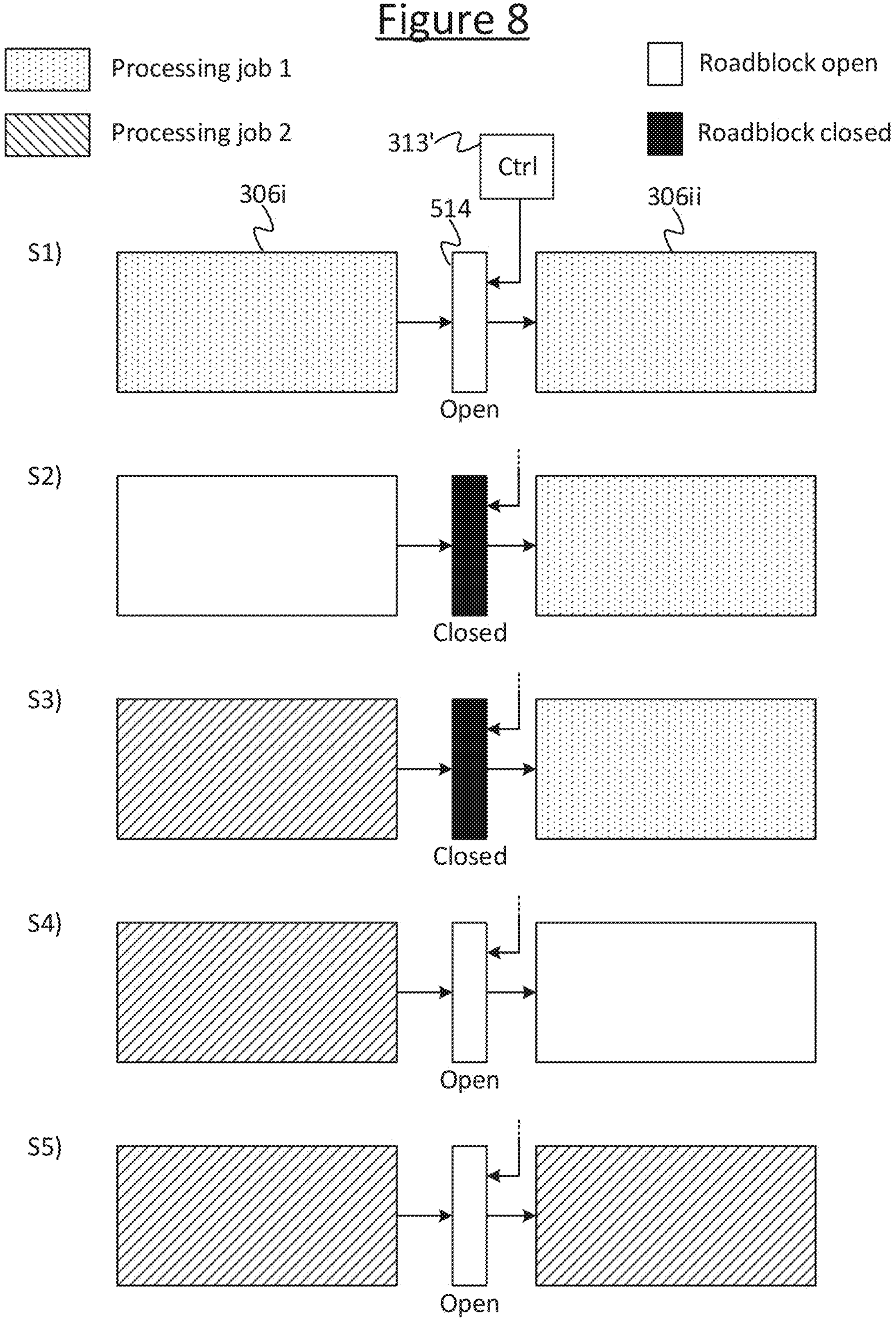
FIG. 8 schematically illustrates a method of using a "roadblock" circuit to enable the overlapping of the spin up or down of one task with the processing of another, for example as shown in FIG. 4*a;*

FIG. 8 illustrates the principle of pipeline partitioning and the roadblock circuit 514 in accordance with the present disclosure. To implement, the scheme requires a register bank 104/304 that can hold descriptors of at least two tasks at once. In embodiments, this may be implemented by an arrangement similar to that described in relation to FIG. 3, as will be described shortly in relation to FIG. 3*a*, where the register bank 304 has a separate register set 309 for each task descriptor that may be held simultaneously, along with associated mux/demux (i.e. selector) circuitry and kick tracker(s). However this is not essential as an implementation. In an alternative implementation for example, the register bank could be implemented as a buffer-type structure such as a circular buffer for queuing task descriptors.

Either way, as shown in FIG. 8, a pipeline is divided into two partitions 306*i*, 306*ii*, which may also be referred to herein as sections. Each section 306*i*, 306*ii* comprises a respective one or more stages of the pipeline. At least some of these stages comprise dedicated hardware circuitry, as described previously in relation to FIGS. 1 and 3 for example. For instances in an example application, the pipeline may be a dedicated hardware pipeline of an application-specific processor such as a GPU. E.g. the pipeline may take the form of a geometry pipeline or fragment pipeline. In embodiments each section 306*i*, 306*ii* comprises multiple pipeline stages. Each section may in fact comprise a sequence of many small stages.

For example, in a geometry pipeline, the front-end 306*i* may comprise modules which fetch input geometry control stream from memory (written by the driver), and fetch index values and assemble primitives according to the topology required. The back-end 306*ii* may comprise everything else—e.g. packing these primitives into groups of fragments or vertices on which to run vertex shaders, performing viewport transform and translation into screen space, clipping, culling, and the writing of an internal parameter buffer structure which is passed from the geometry pipeline to the fragment pipeline.

In a fragment pipeline, the front-end 306*i* may read tile control streams (part of the internal parameter buffer structure) and associated primitive data, and compute edge coefficient calculations. The back-end 306*ii* may then rasterize these primitives to determine which pixels are visible including depth and stencil testing, and then performs pixel shading, texturing and then blend on writing out to the frame buffer (the final colour and alpha values).

Whatever form it takes, the pipeline 306 is connected to a register bank, to which execution logic comprising one or more execution units can write descriptors of tasks to be performed by the pipeline. The execution logic and register bank are not shown in FIG. 8, but the nature of the execution logic, and the manner in which it is connected to the register bank and writes tasks to the register bank, may be the same as described in relation to FIG. 1 or FIG. 3.

A blocking circuit 514, also called a "roadblock" circuit herein, is placed between each pair of adjacent pipeline sections 306*i*, 306*ii*. The term "roadblock" may equally be replaced simply with the term "blocking circuit" anywhere herein.

By way of illustration FIG. 8 shows two pipeline sections, which may be referred to as an upstream section 306*i* and a downstream pipeline section 306*ii* respectively. This does not necessarily mean they are the only two sections of the pipeline, but rather just that the upstream section 306*i* is upstream of the adjacent downstream section 306*ii* within the pipeline (the pipeline stage or stages of the upstream section are farther toward the front or beginning of the pipeline than those of the downstream section, and the stage or stages of the downstream section are farther toward the back or end of the pipeline than those of the upstream section). What is referred to here as the upstream section 306*i* could in fact be downstream of one or more farther upstream sections, and/or the downstream section 306*ii* may be upstream of one or more farther downstream sections. An instance of the roadblock 514 and the associated method described herein may be implemented between each or any pair of sections in the pipeline. But for ease of illustration the disclosed techniques are described in relation to just one pair of adjacent pipeline sections referred to herein, relative to one another, as the upstream section 306*i* and downstream section 306*ii*.

The roadblock 514 is a circuit which can be controlled to take either of an open state or a closed state at different times. In the closed state the roadblock 514 blocks transactions from flowing downstream within the pipeline to the adjacent downstream pipeline stage 306*ii* to continue being processed as part of a downstream phase of the task in question. Whereas in the open state this is not blocked, and transactions can flow from the upstream section 306*i* to the downstream section 306*ii* for downstream processing. "Transactions" in this context refers to the data that is passed from one pipeline stage to the next, in this case from the end of the upstream section to the beginning of the downstream section. Such a transaction comprises at least some data resulting from the processing of an upstream phase of a given task by the upstream pipeline section 306*i*. This data may comprise operand data and/or control signals. Optionally, it may additionally comprise some state information, which could persist over multiple tasks and/or through the different sections of the pipeline (e.g. state that was fed in at the beginning, and is used to control the processing but isn't itself changed from one task to the next and/or from one pipeline section to the next).

The system also comprises control circuitry 313' which triggers the upstream pipeline stage 306*i* to begin processing an upstream phase of each task, and which triggers the downstream pipeline stage 306*ii* to begin processing the downstream phase of each task. As will be discussed shortly with reference to FIG. 3*a*, in certain implementations the control circuitry 313' may comprise a separate instance 313*i*, 313*ii* of the kick manager 313 of FIG. 3 for each of the upstream and downstream pipeline sections 306*i*, 306*ii* respectively.

The control circuitry 313' also controls, directly or indirectly, whether the roadblock 514 currently takes the open or the closed state.

In operation, at step S1) the control circuitry 313' causes the roadblock 514 to take the open state, and triggers the upstream section 306*i* and the downstream section 306*ii* of the pipeline to begin processing the first task. In response, the first task starts feeding through the upstream section 306*i* and then onward to the downstream section 306*ii* in a pipelined manner. The processing is performed based on a respective descriptor of the first task written to the register bank by the software. Since the roadblock 514 is open, the processing by the two sections is performed in a fully pipelined manner, with work flowing freely through the roadblock 514. I.e. the earliest parts of the first task begin at the front of the upstream section 306*i*, and filter down along the upstream section 306*i* and through the roadblock 514 while the front of the upstream section 306*i* continues processing subsequent parts of the first task. In this way, earlier parts of the first task continue through the roadblock 514 and are passed down to the downstream section 306*ii* for processing while the upstream section 306*i* continues processing later parts of the same task.

At step S2), the control circuitry 313' detects that the upstream section of the pipeline 306*i* has finished processing its phase of the first task. As an example implementation, this may be detected by means of a marker, which may be referred to as the "terminate state update" marker, which is inserted at the rear of the work of the first task and which passes along the pipeline at the tail the task. The marker is a piece of control state marking that it's the final element in this task or kick. When the marker reaches the end of the upstream section 306*i* it causes the upstream section 306*i* to raise a signal indicating to the control circuitry 313' that it has finished processing the current task. However this is just one example, and other mechanisms may be employed for detecting when the processing of a given task has been finished by given section of the pipeline.

At step S2), the upstream section of the pipeline 306*i* is briefly empty.

In response to detecting that the upstream section 306*i* has finished processing its phase of the first task, the control circuitry 313' also causes the roadblock 514 to switch to the closed state. In an example implementation, this may be done by means of a pair of mask signals. The control circuitry 313' generates a respective mask signal corresponding to each of the two pipeline sections 306*i*, 306*ii*. Each mask signal indicates which task the control circuitry 313' has currently triggered the respective pipeline section 306*i*, 306*ii* to process, i.e. which task is currently active in the respective pipeline section. The mask signal could therefore equally be called the "active task" signal. The roadblock 514 is configured so as if the two mask signals indicate the same task, it will take the open state (i.e. be transparent), but if the two mask signals indicate different tasks then the roadblock 514 will take the closed state (i.e. be opaque). Thus, if the upstream and downstream sections of the pipeline 306*i*, 306*ii* are currently processing the same task then the roadblock 514 will be open, but if the upstream and downstream sections of the pipeline are currently processing different tasks then the roadblock 514 will be closed. An advantage of this implementation is that it is simple and unambiguous: the mask details when a kick ID is active, and is one-hot, and the roadblock only allows transfer when both are non zero and match, so it is safe and simple. It will be appreciated however that the use of the mask signals is just one example implementation, and in other embodiments other mechanisms could be used for controlling the roadblock 514 to perform the same functionality.

At step S3), the control circuitry 313' triggers the upstream pipeline section 306*i* to start processing the second task. The processing is again based on the respective descriptor written to the register bank by the software. In response, the second task starts feeding through the upstream section of the pipeline 306*i*. I.e. the first parts of the second task start at the front of the pipeline and filter down to the end of the upstream section 306 up to the roadblock 514 while the front of the pipeline continues processing later parts of the second task, in a pipelined manner. However, because the roadblock 514 is closed, transactions that start to be produced by the first task in the upstream section 306*i* cannot follow through to the downstream section 306*ii*. The upstream section 306*i* is a section of the pipeline that can perform its phase of the processing of one task while the downstream section 306*ii* is still processing the respective downstream phase of the preceding task, for example because the configuration of the upstream section 306*i* can be set independently of the configuration of the downstream section 306*ii*, and/or because the processing by the upstream section 306*i* is not dependent on any data produced by the downstream processing of the preceding task by the downstream section 306*ii*. However, the downstream section 306*ii* cannot be allowed to begin processing any part of the second (next) task while it is still processing part of the first (current) task, e.g. because the two tasks may require a conflicting configuration of the downstream section 306*ii*, and/or because the downstream phase of the next task may be dependent on data that may still be being produced from the first or current task.

At step S4), the control circuitry 313' detects that the downstream section of the pipeline 306*ii* has finished processing its phase of the first task. By way of example, this may be detected by means of the "terminate state update" marker, at the tail of the first task, now reaching the end of the downstream section 306*ii*. In this case, then when the marker reaches the end, the downstream section 306*ii* raises a signal to the control circuit 313' indicating that it has finished processing the current task and is now empty.

By whatever means the detection is performed, in response the control circuitry 313' triggers the downstream section 306*ii* to begin processing the downstream phase of the second task. The control circuitry 313' also causes the roadblock 514 to switch back to the open state. In embodiments that use the mask signals, this is because both mask signals now indicate that the second task is now active in their respective sections 306*i*, 306*ii* of the pipeline. However as mentioned, other mechanisms for controlling the roadblock 514 are also possible.

At step S5), with the roadblock 514 now open, the second task starts to flow into the downstream section of the pipeline 306*ii* for processing of the downstream phase of the second task. If some of the upstream phase of the second task has not yet been completed, then the upstream section 306*i* can continue processing those parts of the second task while the downstream section 306*ii* is processing the earlier (frontmost) elements of the task. I.e. with the roadblock 514 now open, the upstream and downstream sections 306*i*, 306*ii* can act again as one continuous length of pipeline.

In embodiments a third task may follow after the second task and so forth. The method operates mutatis mutandis between each pair of adjacent tasks in the same manner as described above between the first and second task.

An example implementation is now described with reference to FIG. 3*a*. This implementation combines the partitioning of a pipeline 306, as described above in relation to FIG. 8, with the kick tracking as described earlier in subsection I with reference to FIG. 3.

The pipeline 306 is divided into at least two partitions: an upstream section 306*i* and downstream section 306*ii*. By way of illustration, embodiments below will be described in terms of just two halves of the pipeline: a single upstream section 306*i* referred to as the front-end, and a single downstream section 306*ii* referred to as the back-end. However, it will be appreciated that this is not limiting and more generally, any reference herein to the front-end and back-end could be replaced with an upstream and a downstream section of any pipeline, respectively, which could be any pair of adjacent sections in the pipeline, and not necessarily the only sections.

Each of the front-end 306*i* and back-end 306*ii* of the pipeline 306 is associated with a respective pair of register subsets 309*ai*, 309*bi* & 309*aii*, 309*bii*. The front-end 306*i* is associated with a first upstream subset of registers 309*ai* and a second upstream subset of registers 309*bi*, and the back-end 306*ii* is associated with a first downstream subset of registers 309*aii* and a second downstream subset of registers 309*bii*. The first upstream and downstream subsets 309*ai*, 309*aii* are subsets of the first register set 309*a* for holding the descriptor of a first task, and the second upstream and downstream subsets 309*bi*, 309*bii* are subsets of the second register set for holding the descriptor of a second task. The descriptors are written to the register sets 309*a*, 309*b* as described earlier in relation to FIG. 3, except with the descriptor divided between upstream and downstream subsets 309*i*, 309*ii*. Within a given set 309, the upstream and downstream subsets 309*i*, 309*ii* are not just duplicates of one another, but rather are the registers required to hold different parts of the respective descriptor as required by the corresponding modules or stages in the front-end 306*i* and back-end 306*ii* respectively. Some modules in both sides may require the same piece of information (for example resolution of screen). In that case those registers are duplicated into front-end and back-end versions in the front- and back-end subsets 309*i*, 309*ii* respectively; and the same value is setup in both with the same value, which then allows hardware muxing to present the correct value as the kick moves through the pipeline.

Each of the front-end 306*i* and back-end 306*ii* is also coupled to a respective kick tracker 305*i*, 305*ii*. Each kick tracker 305*i*, 305*ii* comprises a respective selector (multiplexer-demultiplexer) 312*i*, 312*ii* for connecting one of the respective register subsets 309*i*, 309*ii* to the respective pipeline section 306*i*, 306*ii*. Each kick tracker 305*i*, 305*ii* also comprise a respective kick manager 313*i* and 313*ii*. The kick managers 313*i*, 313*ii* together form an example implementation of the control circuitry 313' described in relation to FIG. 8.

Each of the kick trackers 305*i*, 305*ii* is an instance of the previously-described kick tracker 305, and in embodiments may be configured to operate with respect to its corresponding pipeline section 306*i*, 306*ii* the same manner as described in relation to FIG. 3.

Figure 3A:
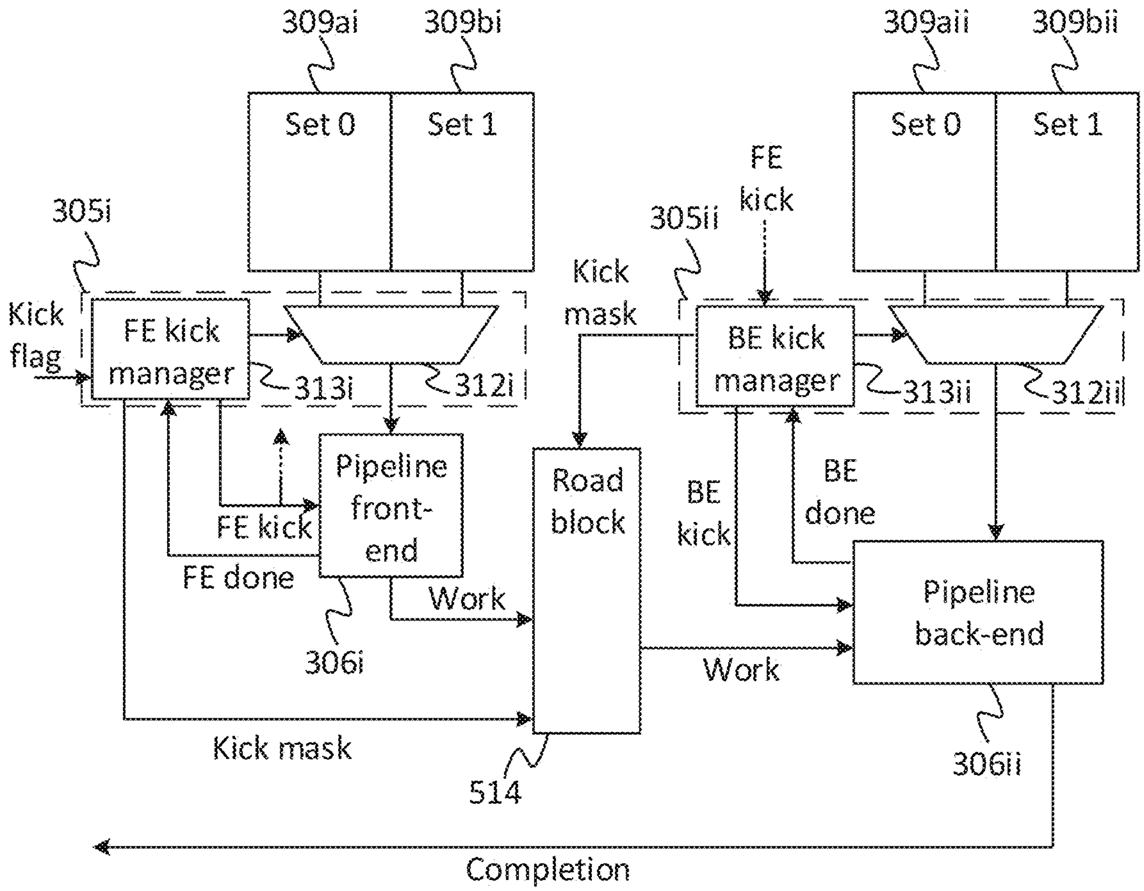
FIG. 3*a* is a schematic block diagram of a variant of that shown in FIG. 3, whereby the pipeline is segmented into an upstream and a downstream section.

In operation, the software writes a descriptor of a first task to the first register set 309*a* and asserts a first kick flag in the first kick register 308*a* (see again FIG. 3, which FIG. 3*a* represents an extension of). The front-end kick manager 313*i* detects this and keeps as pending, internally within the front-end kick manager 313*i*, an indication that the first kick flag has been asserted. It keeps this indication pending until the front-end 306*i* is empty and ready to accept more work. This is signalled via a "front-end done" signal sent from front-end 306*i* to its kick manager 313*i*. The front-end kick manager 313*i* also has a register which records whether a kick is currently active in the front-end. If the front-end 306*i* is initially idle then this begins as de-asserted. So if the front-end was already idle then the front-end done signal is not needed for the kick manager 313*i* to known that the front-end 306*i* is ready.

Once both the kick flag has been asserted and the front-end 306*i* is ready, the front-end kick manager 313*i* issues an upstream kick pulse to the front-end 306*i* to cause it to begin processing the upstream phase of the first task based on the part of the descriptor found in the first upstream subset of registers 309*ai*. The kick manager 313*i* also asserts its internal register recording the front-end 306*i* as now active (until the front-end done signal is received back, at which point this register is de-asserted again). If the front-end 306*i* was previously processing the upstream phase of an existing kick preceding the first kick, then it will not return to ready (idle) state and receive a new kick pulse until this is finished (e.g. as detected via the terminate state update marker). Otherwise if the front-end was simply idle already when the kick flag was asserted, then the upstream kick pulse will simply be issued straight away.

The upstream kick pulse is also routed to the downstream kick manager 313*ii*, and acts like the kick flag to the downstream kick manager 313*ii*. The back-end kick manager 313*ii* detects this and keeps as pending, internally within the back-end kick manager 313*ii*, an indication that the upstream kick pulse has been asserted. It keeps this indication pending until the back-end 306*ii* is empty and ready to accept more work, e.g. again as detected via the terminate state update marker. This is signalled via a "back-end done" signal from back-end 306*ii* to its kick manager 313*ii*. The back-end kick manager 313*ii* also has a register which records whether a kick is currently active in the back-end 306*ii*. If the back-end 306*ii* is initially idle then this begins as de-asserted. So if the back-end 306*ii* was already idle then the back-end done signal is not needed for the kick manager 313*i* to known that the back-end 306*ii* is ready.

Once both the upstream kick pulse has been received and the back-end 306*ii* is ready, the back-end kick manager 313*ii* issues a downstream kick pulse to the back-end 306*ii* to cause it to begin processing the downstream phase of the first task based on the part of the descriptor in the first downstream subset of registers 309*aii*. The kick manager 313*ii* also asserts its internal register recording the back-end 306*ii* as now active (until the back-end done signal is received back, at which point this register is de-asserted again). If the back-end 306*ii* was previously processing the downstream phase of an existing kick preceding the first kick, then it will not return to the ready (idle) state and receive a new kick pulse until this is finished (e.g. again as detected via the terminate state update marker). Otherwise if the back-end was simply idle already when the upstream kick flag was issued, then the downstream kick pulse will simply be issued straight away.

The kick managers 313*i*, 313*ii* between them are arranged to control the roadblock 514 such that it will be closed if the upstream kick pulse for a given task is issued while the back-end 306*ii* is still processing the downstream phase of a previous task; but otherwise the roadblock 514 will be open. In one implementation, in order to achieve this, each of the kick managers 313*i*, 313*ii* is arranged to provide a respective mask signal to the roadblock 514. Each mask signal indicates which task is currently active in its respective associated pipeline section 306*i*, 306*ii*—or more precisely, from which of the task register sets 309*a*, 309*b* the pipeline section is currently processing a task. So in the case of two register sets 309*a*, 309*b*, the respective mask signal for each pipeline section 306*i*, 306*ii* may take the form of a two-bit vector:

00=nothing active
01=kick ID 0 active
10=kick ID 1 active
11=illegal (only one kick ID can be active in a given section 306*i* or 306*ii* at a time)

If the two mask signals are the same, the roadblock 514 will be open (transparent) but if they are different the roadblock will be closed (opaque). So if the front-end mask signal=01 and the back-end mask signal=01, the two signals are equal and so the roadblock 514 will be open. But if the front-end mask signal=01 and the back-end mask signal=10 (or vice versa), they are not equal and the roadblock 514 is closed.

Note: referring to FIG. 8, step S4) represents a brief window of time that may occur in some embodiments after finishing a kick and as the next one is started. As the previous kick finishes, and thus downstream section 306*ii* empties, the roadblock 514 is closed, but opens shortly after as depicted in step S4), at which point data will flow into downstream section 306*ii* from upstream section 306*i* leading to the situation depicted in step S5). If the above-described scheme of mask signals is used to implement the process of FIG. 8, then in practice, there may be a moment, e.g. between S3 and S4, where the mask for the downstream section 306*ii* is 00, even though the next job is already queued up. I.e. in step S3 the mask transitions from 01 (first task active) to 00 (nothing active), and then in step S4 the mask transitions to 10 (second task active). This is because there's a hardware delay between flagging that the first task is finished and then proceeding with the second task. 'A 'nothing active' mask occurs when a pipeline section has finished processing one task and has not yet started another. This may occur (briefly) even if the next task is already queued up for processing, as there may be a delay between ending one task and starting the next.

If the current task is the very first task to be processed ever (or at least the pipeline was in an idle time up until now), the roadblock 514 will start as open and the first task can flow through from front-end 306*i* to back-end 306*ii* unhindered.

Following the assertion of the first kick flag, the software writes a second descriptor to the second register set 309*b* and asserts the second kick flag in the second kick flag register 308*b*. The front-end kick manager 313*i* detects the assertion of the second kick flag and keeps as pending, internally within the front-end kick manager 313*i*, an indication that the second kick flag has been asserted. It keeps this indication pending until the front-end 306*i* sends the front-end done signal to indicate that it has finished processing the upstream phase of the first task and is thus ready to accept more work (e.g. this may again be detected via a terminate state update marker). In response to both these conditions being met (i.e. second kick flag and front-end done), the front-end kick manager 313*i* issues a second upstream kick pulse to the front-end 306*ii*. This causes the front-end 306*i* to begin processing the upstream phase of the second task based on the part of the respective descriptor written to the second upstream register subset 309*bi*. The front-end kick manager 313*i* also clears its internal indicator of the first kick being active, and modifies the front-end mask signal accordingly.

As the upstream kick mask has now been updated to indicate the second task rather than the first, the upstream and downstream mask signals will now be different and so the roadblock 514 will switch to the closed state. This prevents any data from the upstream processing of the second task by the front-end 306*i* flowing through to the back-end 306*ii*, which is still processing the downstream phase of the first task, and may thus otherwise cause configuration or data dependency issues.

The second upstream kick pulse is also routed to the back-end kick manager 313*ii*. The back-end kick manager 313*ii* detects the second upstream pulse and keeps as pending, internally within the back-end kick manager 313*ii*, an indication that the second upstream kick pulse has been asserted. It keeps this indication pending until the back-end 306*ii* sends the back-end done signal to indicate it has now finished the processing the downstream phase of the first task and is thus ready to accept more work (e.g. again this may be detected via the terminate state update marker). In response to both these conditions being met (i.e. second upstream kick pulse and back-end done), the back-end kick manager 313*ii* issues a downstream kick pulse to the back-end 306*ii* to cause it to start processing the downstream phase of the second task based on the part of the respective descriptor written to the second downstream register subset 309*bii*. The back-end kick manager 313*ii* also clears its internal indication of the first task being active in the back-end 306*ii*, and modifies the downstream kick mask accordingly.

As the two mask signals are now the same again (both indicating the kick ID of the second task, or second register set 309*b*), the roadblock 514 switches back to the open state. This means data from the upstream phase of the first task can now flow from the front-end 306*i* to the back-end 306*ii* for processing in the downstream phase of the second task.

Thanks to the roadblock 514, the pipeline 306 can begin spinning up and processing at least some of the second task while still processing a later phase of the first task, but still avoiding potential configuration and/or data dependency issues since the pipeline 306 is suitably partitioned.

In embodiments, the software may write a descriptor of a third task to the first register set 309*a*, overwriting the descriptor of the first task. Alternatively the register bank 304 could support holding more than two descriptors at once. Either way, the method may continue mutatis mutandis applying the roadblock 514 between the second and third task in the same manner as described above in relation to the first and second tasks.

If the pipeline is divided into more than two sections, a respective instance of the register subsets 309*aiii*, 309*biii* etc. and a respective instance of the kick tracker 305*iii*, etc., may be included for each section; and a respective instance of the roadblock 514 may be included between each pair of adjacent sections of the pipeline 306. In this case the kick pulses cascade down between kick managers 313*i*, 313*ii*, 313*iii* etc. mutatis mutandis in the same manner as described above between the first and second kick managers 313*i*, 313*ii*.

In some embodiments, the roadblock 514 may be configured to allow the software to override its state. I.e. the software can force the roadblock 514 to take the closed state when the hardware control circuitry 313' (e.g. mask signals) would otherwise control it to be in the open state, or vice versa. For example, the software might wish to force the roadblock closed if there is work in the back-end 206*ii* which is dependent on a task completing on a different part of the processor, such as another pipeline (not shown). E.g. the fragment back-end might be dependent on the results of a separate compute pipeline. The roadblock 514 only syncs processing within, a given pipeline (e.g. within the fragment pipeline), but without external software control could not know when dependent work done elsewhere in the processor is done (e.g. when the dependent compute work is done). But with a software override, the software can set and then clear a register to implement this dependency.

III. Overlapping Memory Deallocation of One Task with Processing of Another

A GPU typically consumes dynamically allocated memory which is virtualised within the GPU when performing the first phase of a tile-based deferred rendering process, also known as the geometry phase or tile acceleration (TA) phase. This memory is used to write a data structure which is later consumed (read) in the second phase, known as the rendering phase or fragment processing phase. After the memory has been read for the last time in a given kick it can be recycled. This is typically detected at a virtual page (e.g. 16 KB) granularity. A memory management circuit, sometimes known as the parameter management (PM) module, performs both allocation of memory resources in the geometry phase (typically allocating virtual pages from physical pages) and recycling of the memory resource (e.g. physical pages) in the fragment phase in parallel.

When the PM is recycling memory at the end of a fragment phase, the rest of the pipeline is conventionally idle as all tiles have finished processing (which must happen before the last of the memory is recycled). During this time the GPU is inefficient while it waits for the PM to finish before a new fragment phase can begin (even if the ideas of subsections I and/or II above have been implemented). It would be desirable to mitigate this effect.

Accordingly, the present disclosure provides a roadblock circuit between the PM (or memory management circuit) and the fragment processing logic (e.g. fragment pipeline). This enables the overlapping (in time) of the processing of the next fragment kick with the recycling of memory used by the preceding kick.

In optional embodiments, this may be combined with the previous ideas of subsections I and/or II above. In the case of combining with II, the fragment pipeline is divided into at least three logical partitions: front end, back end, and PM deallocator. When combined with I as well, this allows the vast majority of the GPU to begin processing the next kick while the PM completes recycling memory of the previous kick, which improves performance.

Figure 9:
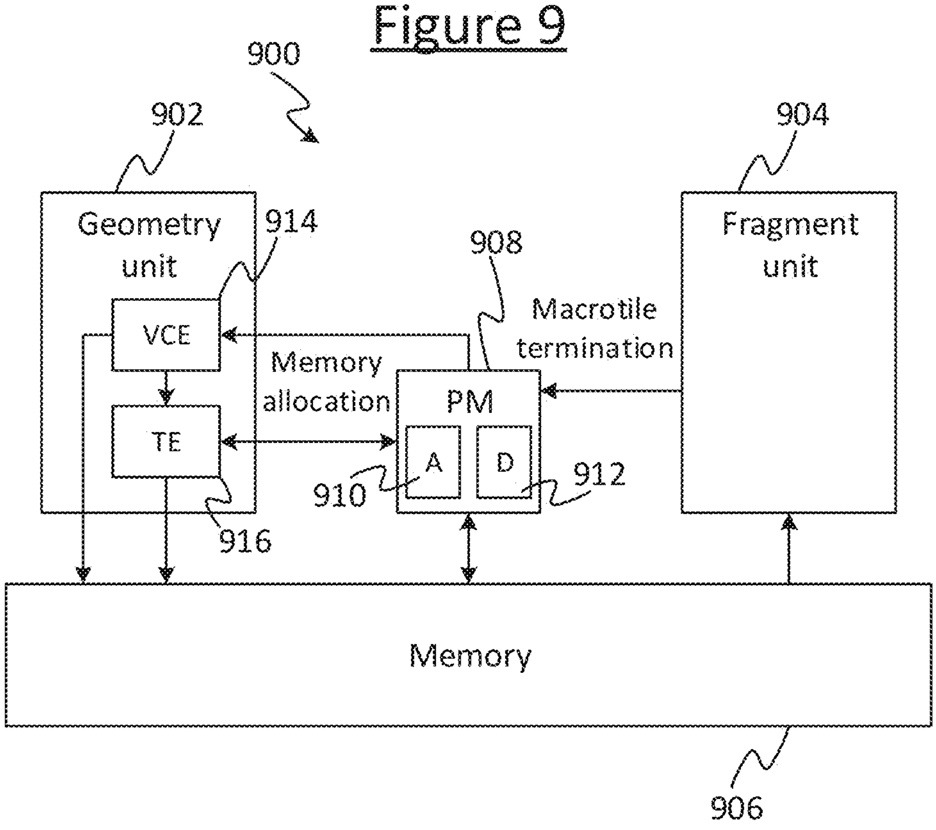
FIG. 9 is a schematic block diagram of a graphics processor comprising a parameter manager for allocating and deallocating memory resources to/from macrotiles.
Figure 10:
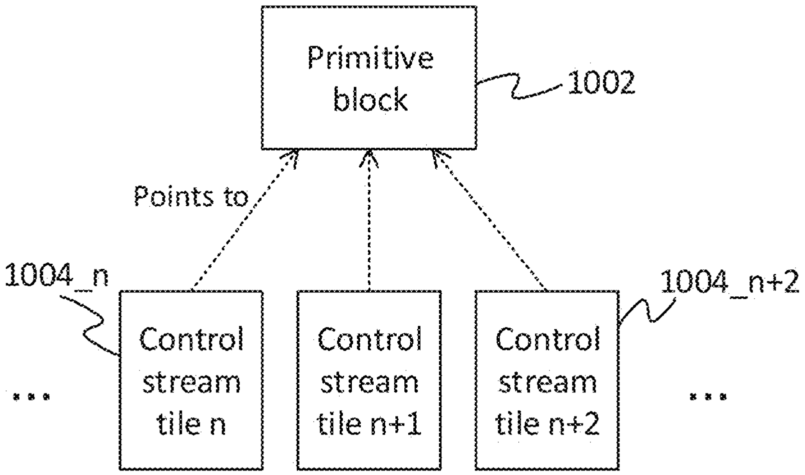
FIG. 10 schematically illustrates a data structure comprising tile data in the form of a control stream for each of a plurality of tiles.
Figure 11:
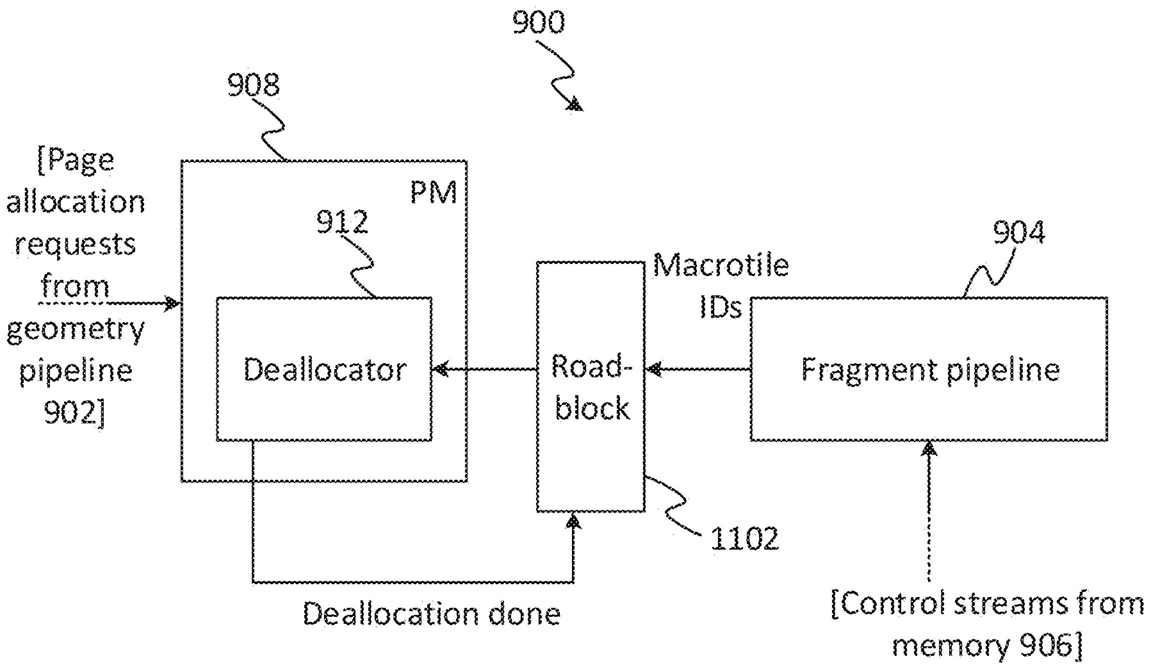
FIG. 11 is a schematic block diagram of a modification to a part of the processor of FIG. 9 including a roadblock circuit for enabling the recycling of memory from one task to overlap with the processing of a subsequent task.

FIGS. 9 to 11 illustrate in more detail the idea of the roadblock between fragment processing logic and memory management circuit (or "parameter manager", PM).

As discussed previously, a GPU typically has a geometry pipeline to perform geometry processing and a fragment pipeline to perform fragment processing. The geometry processing, also called tile acceleration, determines which elements of a 3D model fall in which tiles in 2D screen space. This may comprise for example: applying viewpoint transform, culling and clipping primitives, and writing a data structure which describes the minimal primitives required to describe a 2D tile. In the fragment processing, also called rendering, shading is performed which may comprise for example texturing, lighting and applying effects such as fog, etc.

Many graphics processors employ a two-stage approach to geometry and fragment processing, whereby the geometry pipeline writes an intermediate data structure to memory, which is read by the fragment processing pipeline. This contrasts with an "immediate rendering" approach which doesn't write to memory in between. As mentioned above, a frame may be processed as a single render or a series of renders, and each render may process a render area that is not the whole frame area, and may be composed of sub-renders or multiple passes. The processing of one pass over the render area by the geometry pipeline may be referred to as a geometry kick. The processing of one pass over the render area by the fragment pipeline may be referred to as a fragment kick.

Each kick, also referred to herein as a task, may comprise the processing of a different respective render or performing a different respective pass or sub-render of a given render.

Typically at least the geometry processing will comprise multiple passes over a given frame. When graphics were simpler, geometry processing could just be performed in a single geometry kick, and then the pixels rendered in a fragment kick. Nowadays however there are often many millions of primitives in the geometry, in which case it is more practical to break up the geometry processing of a frame into multiple kicks, otherwise the control stream would be unwieldy. Dividing the processing of a frame into multiple render passes also allows the application to display the information in the format it finds it easier to manage. On the fragment side of processing, sometimes in processing a frame it is desirable to perform some fragment processing to render some pixels to a buffer, which are later read in for further processing. For example they may be creating a shadow map, reflection map, etc., which is then later post processed into the final image. In this way the GPU may be used to perform intermediate stages of processing (i.e. different renders) that build upon one another to create a final correct image for the frame. The concept of performing multiple render passes over a given frame will, in itself, be familiar to a person skilled in the art of graphics processing.

As an example, ten geometry kicks may be run to generate the data for one fragment kick, and that may be done twice per frame. As another example, forty-five geometry kicks may be run for each fragment kick, but only one fragment kick per frame.

FIG. 9 shows an example of a graphics processor 900, which may also be referred to as a GPU. The processor comprises geometry processing logic 902 for performing geometry processing, and fragment processing logic 904 for performing fragment processing (i.e. rendering). Preferably the geometry processing logic 902 takes the form of a geometry pipeline for performing the geometry processing in a pipelined manner, and/or the fragment processing logic 904 takes the form of a fragment pipeline for performing the fragment processing in a pipelined manner. The geometry processing logic 902 and fragment processing logic 904 may be referred to herein as geometry and fragment pipelines respectively, but pipelining internally within these pieces of logic is not absolutely essential and any reference to geometry and fragment pipelines could be replaced more generally with geometry processing logic and fragment processing logic respectively, unless the context requires otherwise.

The geometry pipeline or logic 902 preferably comprises fixed-function hardware circuitry for performing at least some of the geometry processing in dedicated hardware. Similarly, the fragment pipeline or logic preferably comprises fixed-function hardware for performing at least some of the fragment processing in dedicated hardware. Fixed-function circuitry refers to dedicated, special-purpose hardware, as opposed to software. The fixed-function circuitry could still be configurable (such as to operate in different modes or with different parameters), but it is not programmable in the sense that it does not run sequences of instructions. Nonetheless, in alternative embodiments, the possibility is not excluded that some low-level embedded software may be employed to implement part or all of the geometry and/or fragment processing pipelines 902, 904 instead of fixed-function hardware.

In embodiments the geometry pipeline 902 may be arranged as described for the pipeline 106 in FIG. 1 or the pipeline 306 in FIG. 3 or 3*a*. Alternatively or additionally, in embodiments the fragment pipeline 904 may be arranged as another instance of the pipeline 106 as in FIG. 1 or the pipeline 306 as in FIG. 3 or 3*a*.

The processor 900 further comprises memory 906 and a memory management circuit 908. The memory 906 may comprise one or more memory units, e.g. RAM such as DRAM or SRAM. It is preferably internal to the processor 900, onboard the same chip (IC) as the processor 900. However it is not excluded that part or all of the memory 906 could be external. The memory management circuit 908 is implemented in fixed-function hardware circuitry, as opposed to software (though again that does not exclude the possibility that the memory management circuit 908 could have one or more configurable parameters or selectable modes). It may also be referred to herein as the parameter manager (PM) or parameter management module, but this does not necessarily imply any additional limitations beyond the functionality described, and any reference herein to a parameter manager or such like may equally be replaced with the term memory management circuit.

The geometry pipeline 902 comprises at least a tile engine (TE) 916. It may also comprise a vertex compression engine (VCE) 914 if vertex compression is employed. As a result of the geometry processing, the tile engine 916 generates tile data for each tile of each kick in a sequence of kicks (each performing processing of a respective render or a respective pass over a render). The tile data for each tile may also be referred to as a control stream. The use of geometry processing to generate such control streams is, in itself, known in the art. Optionally the tile data, or control streams, may be generated in compressed form. In this case, as illustrated in FIG. 10, the vertex compression engine 914 generates at least one primitive block 1002 comprising compressed and/or uncompressed vertex information, and each tile's control stream 1004_*n* points to at least one primitive block 1002. The control stream 1004 is a list per tile which references primitives in a primitive block 1002, to specify which primitives fall in the respective tile. In some cases a given control stream 1004 may reference more than one primitive block 1002, to specify which primitives from which primitive blocks are in the tile. The primitive block 1002 holds the actual vertex information, such as the coordinates, coefficients, uniforms and varyings, and state to obtain fragment shaders. The vertex information in the control streams 1004 is then represented by reference to the information in one or more such primitive blocks 1002 in order to save space in memory 906.

Control streams can differ in size depending on the particular tile. The primitive block can also vary in size. In some cases a given control stream may point to multiple primitive blocks, for example if the tile contains a lot of geometry.

As well as the fragment pipeline 904 processing the control streams and primitive block(s) written to memory by the geometry pipeline 902, in embodiments the software may also perform some post processing following the geometry phase. For example this may comprise running an interrupt service routine which performs operations such as sampling checksum values and then updating a synchronisation primitive in memory marking the geometry kick as completed, which may unlock submission of further geometry kicks for the current render, or fragment processing on this render.

The parameter manager (memory management circuit) 908 comprises an allocator (A) 910 and deallocator (D) 912. The allocator 910 is arranged to allocate regions of memory, from a pool of memory space available in the memory 906, to the tile engine 916 to use for storing the tile control streams (tile data) 1004. If compression is used, the allocator 910 also allocates one or more regions of memory to the vertex compression engine 914 for storing the primitive block(s) 1002. In embodiments, the regions of memory are allocated as pages of virtual memory, e.g. 16 KB pages. However it is not excluded that in other implementations the allocator 910 could directly allocate physical memory space. The following will be exemplified in terms of allocating pages of virtual memory, but any reference below to pages could be replaced more generally with regions of memory (i.e. any portions of virtual or physical address space).

The deallocator 912 is arranged to deallocate these memory pages or regions once no longer needed. In the case of a virtual memory, deallocating (or "recycling") the allocated virtual memory page may comprise freeing the virtual page to be used for other data, or freeing the underlying physical memory space to be mapped to another virtual page. For example, when deallocating a virtual page, then the physical pages mapped to it may be returned to the free stacks or pool and then can be allocated to any future required virtual page for the same or a different use, e.g. one or more control streams and/or primitive blocks for another geometry kick (either running straight away in an overlapped manner, or being run later in the future). Alternatively the virtual space can be reused by "wrapping". In certain applications, in order to avoid aliasing this may only be safe once it known that the virtual space being wrapped back to has been consumed (i.e. geometry and fragment kicks are done). In embodiments this may be guaranteed by guard logic within the driver (or hardware) which ensures a fragment kick is scheduled to process and free-up virtual space before it could ever be needed again after a wrap. Thus either physical pages can be recycled and immediately be used by something else, or virtual space can be recycled after ensuring that all the space to be reused has been rendered.

The parameter manager (PM) 908 is given a pool of memory and is responsible for dynamically allocating pages of memory (e.g. 16 KB pages) to the tile engine 916 to use for writing control streams 1004, and to the vertex compression engine 914 to use for writing the primitive block(s) 1002 to memory (at the request of these modules). The allocator 910 is responsible for allocating the memory pages, and the deallocator 212 is responsible for returning the pages of memory to the pool (i.e. de-allocating or "recycling" the memory pages).

In some implementations the pool of memory may have a finer granularity (e.g. 4 KB) than the virtual memory pages. The allocator 910 of the PM 908 may allocate whole virtual pages (e.g. 16 KB pages) to the TE 916 and VCE 914*s*, but these may be created by taking four 4 KB physical pages and telling the memory management unit (MMU, not shown) to write a page table entry which maps those physical pages to the virtual page. Accesses to the lowest 4 KB of the virtual page are mapped to the first physical page, and accesses to the next 4 KB of virtual space are mapped to the second and so on.

To facilitate the deallocation of memory resources, the render area of each kick is divided into a plurality of macrotiles, each macrotile comprising a different respective subset of the tiles. In other words the return of memory is managed by dividing the render area into macrotiles (e.g. 4×4 macrotiles per render), where tiles are smaller than macrotiles (e.g. 32×32 samples each). This coarse division gives a good compromise in the way memory is recycled. It may not be practical to return data on a tile-by-tile basis, as that would require very fine-grained control over which tile is allocated to which addresses in memory, and the burden tracking memory on this granularity would itself cause latency. On the other hand, without dividing the area up at all for the purpose of deallocating memory, this would mean waiting for all tiles in a given kick to be processed before returning any of the memory. Freeing memory takes time, and so if the deallocator 912 waited to the end of a fragment kick, this would mean most of the GPU was idle (there would be a bubble) until the end and then a delay at the end (everything except the PM deallocator 912 would be idle and it would be the only thing recycling memory). Instead it is desirable to keep the GPU busy by doing as much as possible recycling as possible of the pages allocated to a given fragment kick during that fragment kick.

Another benefit of not waiting until the end of a fragment kick to deallocate all memory, is that it may be desirable to overlap the geometry kick of the next render with the fragment kick of the render currently being processed by the fragment stage (as disclosed earlier in subsection I). If memory was not freed gradually throughout the fragment processing, then the geometry pipeline could stall waiting for memory to be freed (or else to avoid this an unnecessarily large amount of memory would have to be ringfenced for the pool).

Therefore the parameter manager 908 keeps track of the macrotile content of each allocated memory page, by keeping a page allocation list (which may be stored in the memory 906 or elsewhere such as internal storage of the PM 908). The tile engine 916 requests a page from the allocator 910, uses it to fill up with the control streams of as many tiles or macrotiles as it can, then tells the PM 908 which macrotiles use that page and requests another page, etc. A given page may be used for multiple macrotiles. The vertex compression engine (VCE) performs a similar process for the primitive blocks, if used. The page allocation list is built up based on information sent by the tile engine 916 or VCE 914 in the geometry phase, each time they fill up a page (or have finished all writes at the end of a kick).

Each time the fragment processing of a macrotile is completed, the fragment pipeline 904 sends the ID of the macrotile to the deallocator 912, in order for the deallocator 912 to deallocate the memory page(s) currently allocated to that macrotile. In embodiments, the deallocator 912 accumulates a mask of the macrotiles that are completed so far, and performs a scan of the page allocation list when the mask changes compared to the last time it was scanned. It then de-allocates the memory of any currently-allocated pages with macrotile mask content which is detected to have been completed since the last scan. While a scan is ongoing the mask could be changing again with more updates from the fragment pipeline 904. For example the deallocator 912 may do a scan when macrotile 0 is done, and while that was ongoing, macrotiles 4 & 8 finished, and so the next scan will be with macrotiles 0, 4 & 8 all set in the mask.

Note that the fragment pipeline 904 doesn't need to know what pages are allocated to what macrotiles, or what other macrotiles are in a given page. All it requires are pointers to particular addresses that are specific to a given tile when processing that tile.

The use of macrotiles for coarse-grain memory deallocation reduces the latency incurred by memory deallocation. However there is still some latency at the end of a fragment kick when recycling the memory allocated to the last few macrotiles in the render. Plus there are some "house keeping" functions such as invalidating and flushing caches to do at the end of the kick. To mitigate this remaining latency at the end of a fragment kick, it would be desirable to be able to overlap the recycling the memory of tiles from one fragment kick with the fragment processing of the next fragment kick.

However, the parameter manager 908 should not be given the macrotile IDs freed for the next kick before it has finished freeing the memory of the current kick, because the PM 908 will be currently configured for the current kick it is finishing up—and so the state buffers in memory it has accessed for state, the configuration registers it is using, and the free stacks it is returning physical pages to, could all change. It would be desirable to allow the fragment pipeline 904 to begin processing the next kick and begin providing information about macrotiles it has completed, but to decouple this from the PM 908 while the PM finishes up the current kick. Then after that, the PM can be updated to use the correct configuration registers, load state buffers, and then begin work on the new kick.

To address this, the present invention places a blocking circuit 1102 between the fragment pipeline 904 and the parameter manager 908. FIG. 11 illustrates this addition to the processor of FIG. 9. For simplicity of illustration all the other components of FIG. 9 are not shown in FIG. 11, but they will be understood to be present in the same manner as already described in relation to FIG. 9. As a convenient label the blocking circuit 1102 may also be referred to herein as a "roadblock" or roadblock circuit. Somewhat similarly to the mid-pipeline roadblock 514 described earlier in relation to FIG. 3*a* in subsection II, the roadblock 1102 of FIG. 11 acts like a roadblock or "valve" between two sections or stages of a pipelined processing system. But in this case, the PM's roadblock circuit 1102 blocks macrotile IDs from being fed back to the deallocator 912 of the parameter manager 908 (i.e. memory management circuit) from the fragment pipeline (or logic) 904 for recycling.

The roadblock 1102 is disposed between the fragment pipeline 904 and the parameter manager 908. It is operable to take either an open state or a closed state. In the open state macrotile IDs can pass from the fragment pipeline 904 to the parameter manager 908 in order for the memory pages allocated to the identified macrotiles of be recycled (deallocated). But in the closed state the IDs cannot so pass. While closed any macrotile IDs supplied from the fragment pipeline 904 are kept pending at the roadblock 514 until it next opens, and are then passed through to the PM 908 (i.e. blocking doesn't mean the IDs get discarded).

When a given fragment kick is done, the fragment pipeline 904 can start processing the next fragment kick while the deallocator 912 is still recycling the tiles of the first kick. Because of the roadblock 1102, the fragment pipeline can't start sending completed macrotiles of the second kick to the parameter manager 908 for deallocation. When the deallocator 912 has finished recycling the pages of the first kick, it sends an indication of this to the roadblock 1102, causing the roadblock 1102 to open. This enables the IDs of the macrotiles of the second kick to flow through to the parameter manager 908 so that the deallocator 912 can start recycling the pages of the second kick.

Note that the diagram of FIG. 11 may be somewhat of a schematized simplification, and in embodiments the indication that the fragment pipeline has done processing the current fragment kick may be supplied to the PM 908 vicariously via a kick tracker (not shown in FIG. 11). In this case the kick tracker receives the deallocation done signal from the deallocator 912, and determines based on this that the next kick is now active in the PM 908 for the purpose of memory deallocation. The kick tracker feeds a PM kick mask signal to the roadblock 1102. The PM kick mask signal comprises an active kick ID, indicating which kick is currently active in the deallocator 910 (i.e. which render's macrotiles are currently having their memory pages deallocated). The roadblock 1102 also receives a kick mask signal from the fragment stage indicating which kick the fragment pipeline 902 (or at least the fragment pipeline backend 306*ii*) is currently processing. If the two mask signals indicate the same kick (same task or render), then the roadblock 1102 takes the open state; but if they indicate different kicks then the roadblock 1102 takes the closed state.

FIG. 12 shows one example embodiment in which the idea of FIG. 11 may be incorporated with that of FIG. 3*a*. Here the fragment pipeline 904 is divided into an upstream section 306*i* and a downstream section 306*ii* as in FIG. 3*a*. The upstream and downstream kick trackers 305*i*, 305*ii* and inter-pipeline-section roadblock 514 may operate as described previously in subsection II and in relation to FIG. 3*a*. In addition, the processor 900 comprises the PM roadblock 1102, and the parameter manager 908 including the deallocator 912. It further comprises a PM kick tracker 305PM comprising a PM register selector 312PM and a PM kick manager 313PM. The register bank 304 further comprises a respective subset of registers 309*a*_PM, 309*b*_PM for each of at least two tasks, each for holding a part of the descriptor of each of at least the first task and a second task. These registers configure the PM 306 according to what it is doing. When processing a kick, the PM 908 uses information from configuration registers (in this case 309*a*_PM or 309*b*_PM) which configure it with information for performing the allocation and deallocation, and this configuration information may differ from task-to-task. For instance the configuration information may tell the PM 908 where to read state buffer information which it uses to process the kick—this is kick specific. For example the information in the registers 309*a*_PM/309*b*_PM may direct the PM 908 via base addresses to data structures in memory for performing the memory deallocation (e.g. the size of a data structure which stores pages allocated for control streams and primitive blocks may be stored within a state buffer loaded from memory, along with various other information, such as location and size of free stacks in memory etc.).

The PM roadblock 1102 is arranged to receive the IDs of completed macrotiles of the kick processed by the fragment back-end 306*ii*, and to either pass these on to the PM deallocator 912 or block them depending on whether the PM roadblock 112 is in the open or closed state respectively. The PM kick manager 313PM is arranged to receive the front-end fragment kick pulse ("FE kick") from the front-end kick tracker 313*i*. The front-end kick manager 313*i* is the module that determines whether a kick is going to be run by the hardware or not (a kick pending in the front-end can still be cancelled while pending by the software, but after the front-end kick pulse is issued then the processing of the kick by the pipeline 306 will go ahead). When the front end kick manager 313*i* issues the kick pulse, the other kick managers 313*ii*, 313PM know it will be executed in their partition for sure, so the kick is then marked pending by those managers until the kick can be issued in the respective sections 306*ii*, 308 of the pipeline.

The PM kick manager 313PM also receives the deallocation done signal from the deallocator 912, indicating when the deallocator has finished recycling all the pages of its current kick (current render or task). Based on this the PM kick manager 313PM tracks which kick is currently active in the deallocator 912. The PM kick manager 313PM controls the PM register selector 312PM to connect the deallocator 912 to either the first or second subset of PM registers, depending on which kick is currently active for deallocation.

The PM roadblock 1102 is arranged to receive the back-end kick mask signal from the back-end kick manager 313*ii*, indicating which kick is currently active in the fragment pipeline back-end 306*ii*. The PM roadblock 1102 is also arranged to receive a PM kick mask signal from the PM kick manager 313PM, indicating which kick is currently active in the deallocator 912. The PM roadblock 1102 is configured so as, if these two kick mask signals indicate the same kick, then the PM roadblock 1102 takes the open state so as to allow the IDs of completed macroblocks to flow through from the fragment pipeline back-end 306*ii* to the deallocator 912 in the PM 908 for recycling of the memory pages allocated to the identified macrotiles. However if the two mask signals input to the PM roadblock 1102 indicate different kicks (i.e. the deallocator 912 and fragment back-end 306*ii* are currently working on different tasks or renders), then the PM roadblock 1102 takes the closed state so as to block completed macrotile IDs being passed from the fragment back-end 306*ii* to the deallocator 912, thus stopping the pages allocated to the identified macrotiles of the kick the fragment back-end 306*ii* is currently working on from being recycled until the deallocator 912 has finished deallocating all the macrotiles of the preceding kick.

In embodiments, the PM roadblock 1102 may also be arranged to receive an "end render" notification from the fragment back-end 306*ii* at the end of a kick, and to pass this through to the PM 908 on condition of the roadblock 514 next time it is in the open state. This is a signal which tells the PM 908 that the fragment kick has completed in the fragment back-end partition 306*ii*. This is useful in implementations that can context switch in the middle of a fragment kick. In that case, the end of a given kick cannot be detected purely by detecting that all macrotiles completed, as the pipeline 306 may be instructed to end the kick early by the software (and resume it later on) in order to perform a context switch. In this case an end render notification will be issued before all macrotiles in the current given kick are completed. But if a fragment kick completes entirely without context switch, the end render notification will be issued when all macrotiles are completed.

Note: while everything above has been described in terms of allocating and deallocating memory at a resolution of macrotiles, each comprising a plurality of tiles, this is not absolutely essential and in principle memory allocation and deallocation could be performed on a tile-by-tile basis. Therefore any mention above of macrotiles could be replaced more generally with any spatial units of the render area, each spatial unit comprising one or more tiles.

IV. Further Example Implementation Details

Figure 5:
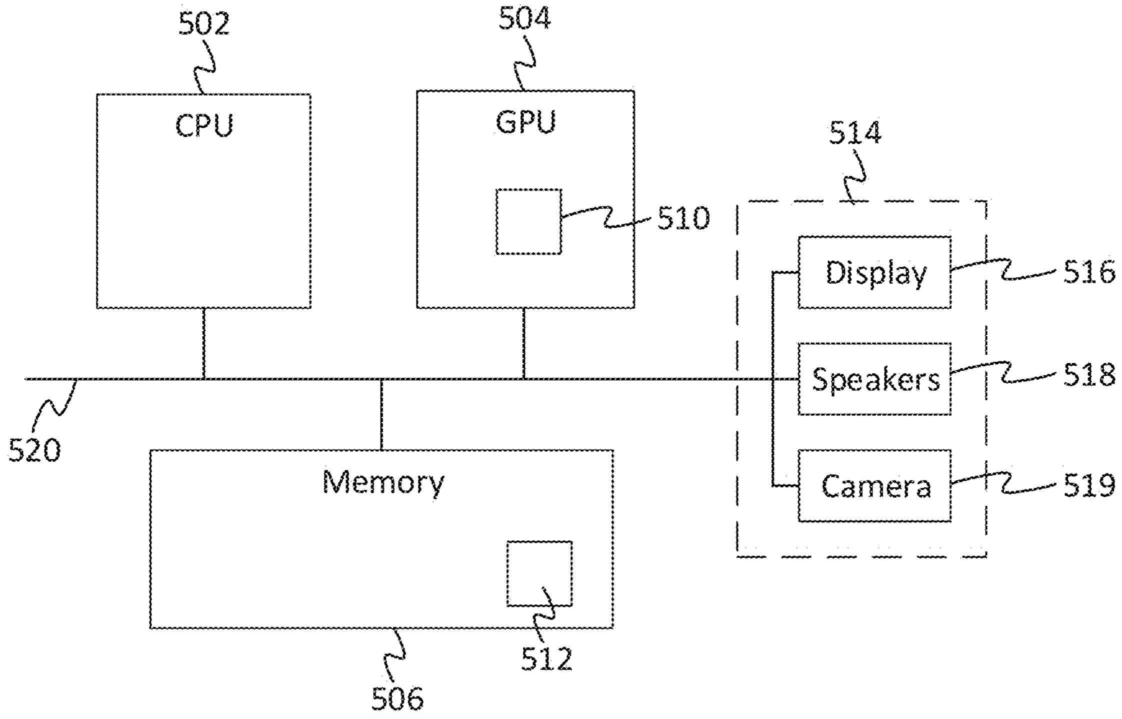
FIG. 5 is a schematic block diagram of a computer system in which a graphics processing system is implemented.

FIG. 5 shows a computer system in which the graphics processing systems described herein may be implemented. The computer system comprises a CPU 502, a GPU 504, a memory 506 and other devices 514, such as a display 516, speakers 518 and a camera 519. A processing block 510 is implemented on the GPU 504. In other examples, the processing block 510 may be implemented on the CPU 502. The processing block 510 may comprise the processor 900 of FIGS. 9 & 11 or 12; and/or the register bank 304, logic 305 and hardware pipeline 306 of FIG. 3 or FIG. 3*a*. The components of the computer system can communicate with each other via a communications bus 520. Software 512 is stored in the memory 506. This may comprise the software (e.g. firmware) run on the execution logic 302 as described in relation to FIG. 3 or FIG. 3*a*. The memory 906 of FIG. 9 may be implemented in the processing block 510, or the memory 506 of FIG. 5, or a combination.

The processor of FIGS. 1, 3, 3*a*, 9, 11 and 12, and the system of FIG. 5, are shown as comprising a number of functional blocks. This is schematic only and is not intended to define a strict division between different logic elements of such entities. Each functional block may be provided in any suitable manner. It is to be understood that intermediate values described herein as being formed by a processor need not be physically generated by the processor at any point and may merely represent logical values which conveniently describe the processing performed by the processor between its input and output.

The processor described herein may be embodied in hardware on an integrated circuit. The processor described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 6.

Figure 6:
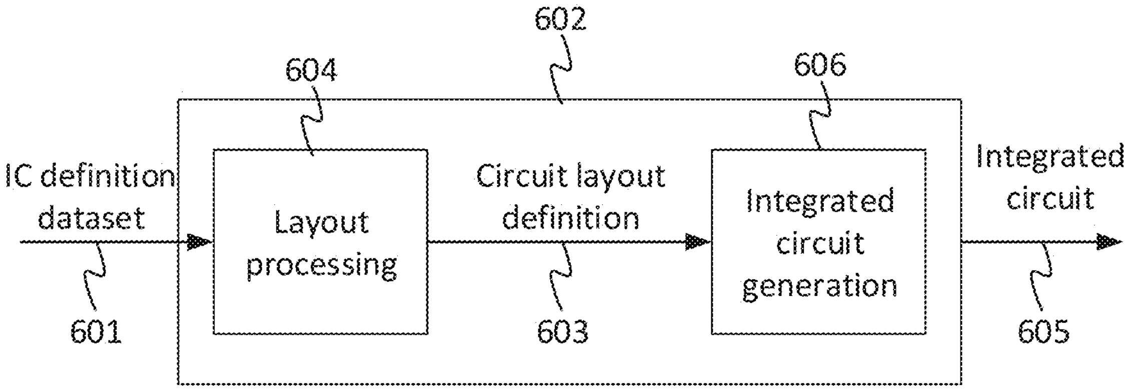
FIG. 6 is a schematic block diagram of an integrated circuit manufacturing system for generating an integrated circuit embodying a graphics processing system.

FIG. 6 shows an example of an integrated circuit (IC) manufacturing system 602 which is configured to manufacture a processor as described in any of the examples herein. In particular, the IC manufacturing system 602 comprises a layout processing system 604 and an integrated circuit generation system 606. The IC manufacturing system 602 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 602 to manufacture an integrated circuit embodying a processor as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 1006. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided a processor as set out in the Summary section.

In embodiments each task may be to process a different render or a different pass over a render.

There may be a hierarchy to the way a frame is processed—each frame may involve one or more renders, and each render may be composed of a single render or multiple sub-renders. So a pass over a frame is a render, and a pass over a render is a sub-render—although in both cases it is possible that there is only a single pass.

The render area may be a frame area or a subarea of the frame area of one or more frames. In embodiments at least some of the different tasks may comprise different renders over the frame area or the same subarea area, or overlapping parts of the frame area. E.g. the different renders may comprise renders of different ones of said frames, or different renders over a same one of said frames or the same subarea of the same frame, or the different passes may comprise different passes over the same frame or same subarea of the same frame. Alternatively the render area does not necessarily have to bear a direct relationship to the eventual frame. An example of this would be rendering a texture to a relatively small area that might only be a few hundred pixels square, to be mapped onto objects in the scene (e.g. which might be at an angle within the scene, and so the rendered texture doesn't appear 'as rendered' in the final scene, but skewed/transformed); whilst the screen or frame size may be much larger, e.g. 1920×780 pixels. In another example, it might be required to render a shadow map that is actually bigger than the screen size, which is then subsequently sampled from when producing the frame image for the screen.

Note also that while in some literature the fragment stage or pipeline is sometimes called the "rendering" stage or pipeline, or such like, more generally the term "render" or "rendering" does not limit to fragment processing and can refer to an overall graphical processing task the GPU performs on the data provided to it.

In embodiments, the memory regions may be pages of a virtual addressing scheme.

In embodiments the spatial units may be macrotiles, each encompassing a plurality of the tiles.

In embodiments, to indicate that it has completed deallocating the memory regions allocated to the spatial units of the first task, the memory management circuit may be configured to send a mask signal to the blocking circuit indicating which of the tasks is currently active in the memory management circuit. The fragment processing logic may be further configured to send a mask signal to the blocking circuit indicating which task is currently being processed by the fragment processing logic. The blocking circuit may be configured to take an open state allowing the identifiers to pass from the fragment processing logic to the memory management circuit when the mask signals indicate the same task, and to take a closed state blocking the identifiers from being passed from the fragment processing logic to the memory management circuit when the mask signals indicate different tasks.

In embodiments, the data structure for each task may further comprise a respective one or more primitive blocks, and the tile data for each tile in the respective task may comprise a control stream specifying vertex information by reference to at least one of the respective one or more primitive blocks.

In embodiments, the geometry processing logic may comprise fixed function hardware circuitry arranged to perform at least some of the geometry processing in hardware. And/or, the fragment processing logic may comprise fixed function hardware circuitry arranged to perform at least some of the fragment processing in hardware.

In embodiments the memory may be comprised by the graphics processor, e.g. incorporated on the same integrated circuit.

The graphics processor may be sold in a form programmed with the software, or yet to be programmed.

According to further aspects disclosed herein, there may be provided a corresponding method of operating the processor, and a corresponding computer program configured to operate the processor.

According to one such aspect, there is provided a method comprising: for each of a sequence of tasks, using geometry processing logic to perform geometry processing and write a data structure resulting therefrom to a memory, the data structure for each tasks comprising respective tile data for each of a plurality of tiles of a render area, each task comprising processing a different render or performing a different pass over a render. The method further comprises: using fragment processing logic to read the tile data of each of the tasks from the memory and perform fragment processing based thereon; and using a memory management circuit to allocate memory regions from the memory to be used by the geometry processing logic to write the tile data, and to deallocate each of the memory regions after the tile data therein has been processed by the fragment processing logic. For each of the tasks, the memory management circuit tracks which of the memory regions are allocated to hold the tile data of which of a plurality of spatial units into which the render area is divided, each spatial unit comprising one or more tiles. For each respective one of the spatial units, the fragment processing logic sends an identifier of the respective spatial unit to the memory management circuit once the fragment processing logic has finished processing the tile data of the respective spatial uni. The memory management circuit deallocates each respective one of the memory regions once the memory management circuit has received the identifier of every spatial unit to which that region is allocated. The fragment processing logic starts processing the tile data of a second of the tasks while the memory management circuit is still deallocating some of the memory regions allocated to the spatial units of a first of the tasks. To enable this, the method comprises blocking the identifiers of the spatial units of the second task being passed to the memory management circuit until the memory management circuit indicates that it has completed deallocating the memory regions allocated to all the spatial units of the first task.

In embodiments, the method may comprise: running software which writes, to a geometry register bank, a first geometry task descriptor specifying the geometry processing of the first task, and a second geometry task descriptor specifying the geometry processing of the second task, the geometry processing of the first and second tasks being performed based on the first and second geometry task descriptors, respectively, from the geometry register bank; wherein the geometry register bank, at least for a period, holds both the first and second geometry task descriptors at once, and based thereon the geometry processing logic begins performing the geometry processing of the first task while the software is still writing the second geometry task descriptor to the geometry register bank.

In embodiments, the geometry pipeline may comprise an upstream geometry pipeline section which performs an upstream phase of the geometry processing, and a downstream geometry pipeline section which performs a downstream phase of the geometry processing, wherein the upstream geometry pipeline section begins the upstream phase of the geometry processing of the second task while the downstream geometry pipeline section is still performing the downstream phase of the geometry processing of the first task. The method may comprise blocking intermediate results from the upstream phase of the geometry processing of the second task passing from the upstream geometry pipeline section to the downstream geometry pipeline section until the downstream geometry pipeline section has finished the downstream phase of the geometry processing of the first task.

In embodiments, the fragment pipeline may comprise an upstream fragment pipeline section which performs an upstream phase of the fragment processing, and a downstream fragment pipeline section which performs a downstream phase of the fragment processing, and fragment pipeline blocking circuitry disposed between the upstream and downstream fragment pipeline sections, wherein the upstream fragment pipeline section begins the upstream phase of the fragment processing of the second task while the downstream fragment pipeline section is still performing the downstream phase of the fragment processing of the first task, the method comprising blocking intermediate results from the upstream phase of the fragment processing of the second task passing from the upstream fragment pipeline section to the downstream fragment pipeline section until the downstream fragment pipeline section has finished the downstream phase of the fragment processing of the first task.

In an example use case of any embodiments, the method may repeat cyclically, alternating back-and-forth between the first and second register sets.

According to yet further aspects there may be provided a corresponding method of manufacturing the processor, a corresponding manufacturing facility arranged to manufacture the processor, and a corresponding circuit design data set embodied on computer-readable storage.

For instance according to one aspect there may be provided a non-transitory computer readable storage medium having stored thereon a computer readable description of the processor of any embodiment herein which, when processed in an integrated circuit manufacturing system, causes the integrated circuit manufacturing system to: process, using a layout processing system, the computer readable description of the processor so as to generate a circuit layout description of an integrated circuit embodying said processor; and manufacture, using an integrated circuit generation system, the processor according to the circuit layout description.

According to another aspect, there may be provided an integrated circuit manufacturing system comprising: a non-transitory computer readable storage medium having stored thereon a computer readable description of the processor of any embodiment disclosed herein; a layout processing system configured to process the computer readable description so as to generate a circuit layout description of an integrated circuit embodying said processor; and an integrated circuit generation system configured to manufacture the processor according to the circuit layout description.

According to another aspect there may be provided a method of manufacturing, using an integrated circuit manufacturing system, a processor of any embodiment disclosed herein, the method comprising: processing, using a layout processing system, a computer readable description of said circuit so as to generate a circuit layout description of an integrated circuit embodying the processor; and manufacturing, using an integrated circuit generation system, the processor according to the circuit layout description.

According to another aspect there may be provided a layout processing system configured to determine positional information for logical components of a circuit derived from the integrated circuit description so as to generate a circuit layout description of an integrated circuit embodying the processor of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. A processor comprising:

a first processing pipeline arranged, for each of a sequence of tasks, to perform a first stage of processing and write a data structure resulting therefrom to a memory, the data structure for each task comprising respective data of the task;

a second processing pipeline arranged to read the respective data of each of the tasks from the memory and perform a second stage of processing based thereon; and a memory management circuit arranged to allocate memory regions from the memory to be used by the first processing pipeline to write the data of each task, and to deallocate each of the memory regions after the data therein has been processed by the second processing pipeline; wherein:

for each task, the memory management circuit is configured to track which of the memory regions are allocated to hold which of a plurality of data portions into which the respective data of the task is divided;

for each respective one of the data portions, the second processing pipeline is configured so as, once it has finished processing the respective data portion, to send an identifier of the respective data portion to the memory management circuit;

the memory management circuit is configured to deallocate each respective one of the memory regions once the memory management circuit has received the identifier of every data portion to which that region is allocated; and the processor further comprises a blocking circuit enabling the second processing pipeline to start processing a second of said sequence of tasks while the memory management circuit is still deallocating some of the memory regions allocated to the data portions of a first of said sequence of tasks, the blocking circuit being configured to prevent the identifiers of the data portions of the second task being passed to the memory management circuit until the memory management circuit indicates that it has completed deallocating the memory regions allocated to all the data portions of the first task.

2. The processor of claim 1, wherein the first processing pipeline comprises a first graphics processing pipeline, and the second processing pipeline comprises a second graphics processing pipeline.

3. The processor of claim 1, wherein the respective data of each task comprises graphics data.

4. The processor of claim 3, wherein each data portion of a task corresponds to a different spatial unit of a render area.

5. The processor of claim 1, wherein the memory regions are pages of a virtual addressing scheme.

6. The processor of claim 1, wherein the spatial units are macrotiles, each encompassing a plurality of the tiles.

7. The processor of claim 1, wherein:

to indicate that it has completed deallocating the memory regions allocated to the data portions of the first task, the memory management circuit is configured to send a mask signal to the blocking circuit indicating which of the tasks is currently active in the memory management circuit, the second processing pipeline being further configured to send a mask signal to the blocking circuit indicating which task is currently being processed by the second processing pipeline; and the blocking circuit is configured to take an open state allowing the identifiers to pass from the second processing pipeline to the memory management circuit when the mask signals indicate the same task, and to take a closed state blocking the identifiers from being passed from the second processing pipeline to the memory management circuit when the mask signals indicate different tasks.

8. The processor of claim 1, wherein the data structure for each task comprises: a respective one or more primitive blocks, and a control stream specifying vertex information by reference to at least one of the respective one or more primitive blocks.

9. The processor of claim 1, wherein the first processing pipeline comprises fixed function hardware circuitry arranged to perform at least some of the first stage of processing in hardware.

10. The processor of claim 1, wherein the second processing pipeline comprises fixed function hardware circuitry arranged to perform at least some of the second stage of processing in hardware.

11. The processor of claim 1, further comprising a first register bank to which software can write a first task descriptor specifying the first stage of processing of the first task, and a second task descriptor specifying the first stage of processing of the second task, the first processing pipeline being arranged to perform the first stage of processing of the first and second tasks based on the first and second task descriptors, respectively, from the first register bank;

wherein the first register bank is operable to hold both the first and second task descriptors at once, and the first processing pipeline is configured to begin performing the first stage of processing of the first task while the software is still writing the second task descriptor to the first register bank.

12. The processor of claim 11, wherein the first processing pipeline is further configured to begin performing the first stage of processing of the second task while the software is post-processing a result of the first stage of processing of the first task.

13. The processor of claim 1, further comprising a second register bank to which software can write a third task descriptor specifying the second stage of processing of the first task, and a fourth task descriptor specifying the second stage of processing of the second task, the second processing pipeline being arranged to perform the second stage of processing of the first and second tasks based on the third and fourth task descriptors, respectively, from the second register bank;

wherein the second register bank is operable to hold both the third and fourth task descriptors at once, and the second processing pipeline is configured to begin performing the second stage of processing of the first task while the software is still writing the fourth task descriptor to the fragment register bank.

14. The processor of claim 13, wherein the second processing pipeline is further configured to begin performing the second stage of processing of the second task while the software is post-processing a result of the second stage of processing of the first task.

15. The processor of claim 1, wherein: the first processing pipeline comprises a geometry pipeline, the first stage of processing comprising geometry processing; and the second processing pipeline comprises a fragment processing pipeline, the second stage of processing comprising fragment processing.

16. The processor of claim 1, wherein the memory is comprised by the processor.

17. A non-transitory computer readable storage medium having stored thereon a computer readable description of a processor as set forth in claim 1 that, when processed in an integrated circuit manufacturing system, causes the integrated circuit manufacturing system to manufacture an integrated circuit embodying the processor.

18. An integrated circuit manufacturing system configured to manufacture a processor as set forth in claim 1.

19. A method comprising:

for each of a sequence of tasks, using a first processing pipeline to perform a first stage of processing and write a data structure resulting therefrom to a memory, the data structure for each tasks comprising respective data of the task;

using a second processing pipeline to read the respective data of each of the tasks from the memory and perform a second stage of processing based thereon; and using a memory management circuit to allocate memory regions from the memory to be used by the first processing stage to write the respective data, and to deallocate each of the memory regions after the data therein has been processed by the second processing pipeline; wherein:

for each of the tasks, the memory management circuit tracks which of the memory regions are allocated to hold which of a plurality of data portions into which the respective data of the task is divided;

for each of the tasks, for each respective one of the data portions of the task, the second processing pipeline sends an identifier of the respective data portion to the memory management circuit once the fragment processing logic has finished processing the respective data portion;

the memory management circuit deallocates each respective one of the memory regions once the memory management circuit has received the identifier of every data portion to which that region is allocated; and the second processing pipeline starts processing the respective data of a second of the tasks while the memory management circuit is still deallocating some of the memory regions allocated to the data portions of a first of the tasks, the method comprising blocking the identifiers of the data portions of the second task being passed to the memory management circuit until the memory management circuit indicates that it has completed deallocating the memory regions allocated to all the data portions of the first task.

20. A non-transitory computer readable storage medium having stored thereon computer readable code configured when run on one or more processors to cause the one or more processors to:

for each of a sequence of tasks, operate a first processing pipeline to perform a first stage of processing and write a data structure resulting therefrom to a memory, the data structure for each task comprising respective data for the task;

operate a second processing pipeline to read the respective data of each of the tasks from the memory and perform a second stage of processing based thereon; and use a memory management circuit to allocate memory regions from the memory to be used by the first processing pipeline to write the respective data, and to deallocate each of the memory regions after the data therein has been processed by the second processing pipeline; wherein:

for each of the tasks, the memory management circuit tracks which of the memory regions are allocated to hold the data of which of a plurality of data portions into which the respective data of the task is divided;

for each of the tasks, for each respective one of the data portions of the task, the second processing pipeline sends an identifier of the respective data portion to the memory management circuit once the second processing pipeline has finished processing the respective data portion;

the memory management circuit deallocates each respective one of the memory regions once the memory management circuit has received the identifier of every data portion to which that region is allocated; and the second processing pipeline starts processing a second of the tasks while the memory management circuit is still deallocating some of the memory regions allocated to the data portions of a first of the tasks, the method comprising blocking the identifiers of the data portions of the second task being passed to the memory management circuit until the memory management circuit indicates that it has completed deallocating the memory regions allocated to all the data portions of the first task.

* * * * *